US012450782B2

(12) United States Patent
Agarwal et al.

(10) Patent No.: US 12,450,782 B2
(45) Date of Patent: Oct. 21, 2025

(54) LATENT SPACE BASED STEGANOGRAPHIC IMAGE GENERATION

(71) Applicant: Adobe Inc., San Jose, CA (US)

(72) Inventors: Shruti Agarwal, Berkeley, CA (US); John Philip Collomosse, Pyrford (GB)

(73) Assignee: Adobe Inc., San Jose, CA (US)

( * ) Notice: Subject to any disclaimer, the term of this patent is extended or adjusted under 35 U.S.C. 154(b) by 223 days.

(21) Appl. No.: 18/471,456

(22) Filed: Sep. 21, 2023

(65) Prior Publication Data

US 2025/0104288 A1 Mar. 27, 2025

(51) Int. Cl.
*G06T 9/00* (2006.01)
*G06T 1/00* (2006.01)

(52) U.S. Cl.
CPC .............. *G06T 9/002* (2013.01); *G06T 1/00* (2013.01); *G06T 1/0085* (2013.01); *G06T 2201/0053* (2013.01)

(58) Field of Classification Search
CPC ......... G06T 9/002; G06T 1/0085; G06T 1/00; G06N 3/04
See application file for complete search history.

(56) References Cited

U.S. PATENT DOCUMENTS

2022/0405875 A1* 12/2022 Krishnamoorthy ..... G06F 21/84

OTHER PUBLICATIONS

Baba, Sami et al., "Watermarking scheme for copyright protection of digital images", IJCSNS International Journal of Computer Science and Network Security, vol. 9 No. 4 [retrieved Aug. 11, 2023]. Retrieved from the Internet <http://paper.ijcsns.org/07_book/200904/20090401.pdf>., Apr. 2009, 9 Pages.
Bharati, Aparna et al., "Transformation-aware embeddings for image provenance", IEEE Transactions on Information Forensics and Security, vol. 16 [retrieved Aug. 11, 2023]. Retrieved from the Internet <https://doi.org/10.1109/TIFS.2021.3050061>, Jan. 8, 2021, 15 pages.
Black, Alexander et al., "Vpn: Video provenance network for robust content attribution", Cornell University arXiv, arXiv.org [retrieved Aug. 11, 2023]. Retrieved from the Internet <https://arxiv.org/pdf/2109.10038.pdf>., Sep. 21, 2021, 10 Pages.

(Continued)

Primary Examiner — Joseph J Lauture
(74) Attorney, Agent, or Firm — FIG. 1 Patents

(57) ABSTRACT

Techniques for latent space based steganographic image generation are described. A processing device, for instance, receives a digital image and a secret that includes a bit string. A pretrained encoder of an autoencoder generates an embedding of the digital image that includes latent code. A secret encoder is trained and utilized to generate an embedding of the secret to act as a latent offset to the latent code. The processing device leverages a pretrained decoder of the autoencoder to generate a steganographic image based on the embedding of the secret and the embedding of the digital image. The steganographic image includes the secret and is visually indiscernible from the digital image. Further, the processing device is configured to recover the secret from the steganographic image, such as by training and leveraging a secret decoder to extract the secret.

20 Claims, 12 Drawing Sheets
(7 of 12 Drawing Sheet(s) Filed in Color)

(56) References Cited

OTHER PUBLICATIONS

Bose, R.C. et al., "On a class of error correcting binary group codes", Information and Control, vol. 3, No. 1 [retrieved Aug. 11, 2023]. Retrieved from the Internet <doi.org/10.1016/S0019-9958(60)90287-4>., 1960, 12 Pages.

Caron, Mathilde et al., "Emerging Properties in Self-Supervised Vision Transformers", Cornell University arXiv, arXiv.org [retrieved Aug. 10, 2023]. Retrieved from the Internet <https://arxiv.org/pdf/2104.14294.pdf>., May 24, 2021, 21 Pages.

Ching-Chun, Chang et al., "Neural Reversible Steganography with Long Short-Term Memory", Security and Communication Networks; London vol. 2021 [retrieved Aug. 10, 2023]. Retrieved from the Internet <https://media.proquest.com/media/hms/PFT/1/zOQpl?_s=fACZdQE1xHIOfxyTjOUZRdSymUA%3D>., Apr. 5, 2021, 15 Pages.

Coalition for Content Provenance, , "C2PA Technical Specification", Coalition for Content Provenance Online Database [retrieved Nov. 29, 2023]. Retrieved from the Internet <https://c2pa.org/specifications/specifications/1.0/specs/C2PA_Specification.html> Document 2 of 2, Jul. 26, 2022, 140 pages.

Coalition for Content Provenance, , "C2PA Technical Specification", Coalition for Content Provenance Online Database [retrieved Nov. 29, 2023]. Retrieved from the Internet <https://c2pa.org/specifications/specifications/1.0/specs/C2PA_Specification.html> Document 1 of 2, Need both citations to have complete document, Jul. 26, 2022, 140 pages.

Devi, P. et al., "A fragile watermarking scheme for image authentication with tamper localization using integer wavelet transform", Journal of Computer Science, vol. 5, No. 11 [retrieved Aug. 11, 2023]. Retrieved from the Internet <https://citeseerx.ist.psu.edu/document?repid=rep1&type=pdf&doi=add77267cbaa608a8ef9f53a0b48dcfb4bb2fda5>., 2009, 7 Pages.

Duan, Xintao , "Coverless information hiding based on generative model", Cornell University arXiv, arXiv.org [retrieved Aug. 11, 2023]. Retrieved from the Internet <https://arxiv.org/pdf/1802.03528.pdf>., Feb. 10, 2018, 4 Pages.

Duan, Xintao et al., "Reversible Image Steganography Scheme Based on a U-Net Structure", IEEE Access, vol. 7 [retrieved Aug. 10, 2023]. Retrieved from the Internet <https://web.archive.org/web/20210429085409id_/https://ieeexplore.ieee.org/ielx7/6287639/8600701/08604041.pdf>., Jan. 6, 2019, 10 Pages.

Esser, Patrick et al., "Taming Transformers for High-Resolution Image Synthesis", Cornell University arXiv, arXiv.org [retrieved Aug. 10, 2023]. Retrieved from the Internet <https://arxiv.org/pdf/2012.09841.pdf>., Jun. 23, 2021, 52 Pages.

Fernandez, Pierre et al., "Watermarking images in selfsupervised latent spaces", Cornell University arXiv, arXiv.org [retrieved Aug. 10, 2023]. Retrieved from the Internet <https://arxiv.org/pdf/2112.09581.pdf>., Mar. 23, 2022, 9 Pages.

Fernandez, Pierre et al., "Watermarking images in self-supervised latent spaces", Cornell University arXiv, arXiv.org [retrieved Aug. 11, 2023]. Retrieved from the Internet <https://arxiv.org/pdf/2112.09581.pdf>., Mar. 23, 2022, 9 Pages.

Ghazanfari, Kazem et al., "Lsb++: An improvement to Isb+ steganography", Tencon IEEE Region 10 Conference [retrieved Aug. 10, 2023]. Retrieved from the Internet <10.1109/TENCON.2011.6129126>., Nov. 2011, 5 Pages.

He, Kaiming et al., "Deep Residual Learning for Image Recognition", Cornell University arXiv Preprint, arXiv.org [retrieved Aug. 11, 2023]. Retrieved from the Internet <https://arxiv.org/pdf/1512.03385.pdf>., Dec. 10, 2015, 12 pages.

Hendrycks, Dan et al., "Benchmarking neural network robustness to common corruptions and perturbations", Cornell University arXiv, arXiv.org [retrieved Aug. 11, 2023]. Retrieved from the Internet <https://arxiv.org/pdf/1903.12261.pdf>., Mar. 28, 2019, 16 Pages.

Hodosh, M. et al., "Framing Image Description as a Ranking Task: Data, Models and Evaluation Metrics", Journal of Artificial Intelligence Research, vol. 47 [retrieved Aug. 11, 2023]. Retrieved from the Internet <https://www.jair.org/index.php/jair/article/view/10833/25854>., Aug. 30, 2013, 47 Pages.

Holub, Vojtěch et al., "Designing steganographic distortion using directional filters", IEEE International Workshop on Information Forensics and Security (WIFS) [retrieved Aug. 10, 2023]. Retrieved from the Internet <http://www.ws.binghamton.edu/Fridrich/Research/WOW_rewritten_ver_WIFS_02.pdf>., Dec. 2021, 6 Pages.

Holub, Vojtěch et al., "Universal distortion function for steganography in an arbitrary domain", EURASIP Journal on Information Security [retrieved Aug. 10, 2023]. Retrieved from the Internet <https://citeseerx.ist.psu.edu/document?repid=rep1&type=pdf&doi=4f1062edf0ad8127c125ff4b67f56d1f41ef18bf>., Jan. 2014, 13 Pages.

Huang, Chen-Hsiu , "Image data hiding with multi-scale autoencoder network", Cornell University arXiv, arXiv.org [retrieved Aug. 10, 2023]. Retrieved from the Internet <https://arxiv.org/pdf/2201.06038.pdf>., Jan. 16, 2022, 6 Pages.

Huiskes, Mark J. et al., "The mir flickr retrieval evaluation", MIR '08: Proceedings of the 1st ACM international conference on Multimedia information retrieval [retrieved Aug. 11, 2023]. Retrieved from the Internet <https://press.liacs.nl/mirflickr/mirflickr.pdf>., Oct. 30, 2008, 5 Pages.

Karras, Tero et al., "Training Generative Adversarial Networks with Limited Data", Cornell University arXiv, arXiv.org [retrieved Aug. 11, 2023]. Retrieved from the Internet <https://arxiv.org/pdf/2006.06676.pdf>., Oct. 7, 2020, 37 Pages.

Li, Ming et al., "Improve Image Codec's Performance By Variating Post Enhancing Neural Network:Submission of zxw for CLIC2020", Proceedings of the IEEE/CVF Conference on Computer Vision and Pattern Recognition (CVPR) Workshops [retrieved Nov. 29, 2023]. Retrieved from the Internet <https://doi.org/10.1109/CVPRW50498.2020.00065>, Jun. 2020, 4 pages.

Li, Xiaoxia et al., "A steganographic method based upon JPEG and particle swarm optimization algorithm", Information Sciences: an International Journal, vol. 177, No. 15 [retrieved Aug. 10, 2023]. Retrieved from the Internet <https://doi.org/10.1016/j.ins.2007.02.008>, Aug. 1, 2007, 11 pages.

Liu, Xiyao et al., "Image disentanglement autoencoder for steganography without embedding", IEEE/CVF Conference on Computer Vision and Pattern Recognition [retrieved Aug. 11, 2023]. Retrieved from the Internet <10.1109/CVPR52688.2022.00234>., Mar. 21, 2022, 10 Pages.

Meng, Ruohan et al., "A fusion steganographic algorithm based on faster ronn", Computers, Materials & Continua vol. 55, No. 1 [retrieved Aug. 10, 2023]. Retrieved from the Internet <https://cdn.techscience.cn/files/cmc/2018/v55n1/cmc.2018.055.001.pdf>., 2018, 16 Pages.

Meng, Ruohan , "A Fusion Steganographic Algorithm Based on Faster R-CNN", Computers, Materials & Continua . 2018, vol. 55 No. 1 [retrieved Aug. 11, 2023]. Retrieved from the Internet <https://cdn.techscience.cn/files/cmc/2018/v55n1/cmc.2018.055.001.pdf>., 2018, 16 Pages.

Navas, K. A. et al., "DWT-DCT-SVD Based Watermarking", 3rd International Conference on Communication Systems Software and Middleware and Workshops [retrieved Nov. 29, 2023]. Retrieved from the Internet <https://doi.org/10.1109/COMSWA.2008.4554423>, Jan. 2008, 4 pages.

Nguyen, E. et al., "Oscar-net: Object-centric scene graph attention for image attribution", IEEE International Conference on Computer Vision [retrieved Aug. 11, 2023]. Retrieved from the Internet <https://openaccess.thecvf.com/content/ICCV2021/papers/Nguyen_OSCAR-Net_Object-\Centric_Scene_Graph_Attention_for_Image_Attribution_ICCV_2021_paper.pdf>., 2021, 10 Pages.

Pevný, Tomáš et al., "Using High-Dimensional Image Models to Perform Highly Undetectable Steganography", IH'10: Proceedings of the 12th international conference on Information hiding [retrieved Aug. 19, 2023]. Retrieved from the Internet <https://hal.science/hal-00541353v1/document>., Jun. 28, 2010, 18 Pages.

Provos, Niels , "Defending against statistical steganalysis", Electrical Engineering and Computer Science, Department of (EECS) Engineering [retrieved Aug. 10, 2023]. Retrieved from the Internet <https://deepblue.lib.umich.edu/bitstream/handle/2027.42/107890/citi-tr-01-4.pdf?sequence=1&isAllowed=y>., Feb. 12, 2001, 12 Pages.

(56) References Cited

OTHER PUBLICATIONS

Qin, Jiaohua et al., "Coverless image steganography: a survey", IEEE Access, vol. 7 [retrieved Aug. 11, 2023]. Retrieved from the Internet <https://ieeexplore.ieee.org/stamp/stamp.jsp?tp=&arnumber=8911367>., Nov. 25, 2019, 23 Pages.

Ramachandran, Prajit et al., "Swish: a self-gated activation function", Cornell University arXiv, arXiv.org [retrieved Aug. 11, 2023]. Retrieved from the Internet <https://arxiv.org/pdf/1710.05941v1.pdf?source=post_page>., Oct. 16, 2017, 12 Pages.

Ramesh, Aditya et al., "Hierarchical Text-Conditional Image Generation with CLIP Latents", Cornell University arXiv, arXiv.org [retrieved Aug. 11, 2023]. Retrieved from the Internet <https://arxiv.org/pdf/2204.06125.pdf>., Apr. 13, 2022, 27 Pages.

Rombach, Robin et al., "High-Resolution Image Synthesis with Latent Diffusion Models", Cornell University arXiv, arXiv.org [retrieved Aug. 11, 2023]. Retrieved from the Internet <https://arxiv.org/pdf/2112.10752.pdf>., Apr. 13, 2022, 45 Pages.

Saharia, Chitwan et al., "Photorealistic Text-to-Image Diffusion Models with Deep Language Understanding", Cornell University arXiv, arXiv.org [retrieved Aug. 11, 2023]. Retrieved from the Internet <https://arxiv.org/pdf/2205.11487.pdf>., May 23, 2022, 46 Pages.

Selvaraju, Ramprasaath et al., "Grad-cam: Visual explanations from deep networks via gradient-based localization", Cornell University arXiv, arXiv.org [retrieved Aug. 11, 2023]. Retrieved from the Internet <https://arxiv.org/pdf/1610.02391.pdf>., Dec. 3, 2019, 23 Pages.

Shaham, Tamar R. et al., "SinGAN: Learning a Generative Model From a Single Natural Image", Cornell University arXiv, arXiv.org [retrieved Aug. 11, 2022]. Retrieved from the Internet <https://arxiv.org/pdf/1905.01164.pdf>., Sep. 4, 2019, 11 Pages.

Shin, Richard et al., "JPEG-resistant Adversarial Images", NIPS 2017 Workshop on Machine Learning and Computer Security, vol. 1 [retrieved Aug. 11, 2023]. Retrieved from the Internet <https://machine-learning-and-security.github.io/papers/mlsec17_paper_54.pdf>., 2017, 6 Pages.

Subramanian, Nandhini et al., "End-to-End Image Steganography Using Deep Convolutional Autoencoders", IEEE Access, vol. 9 [retrieved Aug. 10, 2023]. Retrieved from the Internet <https://irep.ntu.ac.uk/id/eprint/46088/1/1534919_Cheheb.pdf>., Sep. 20, 2021, 9 Pages.

Taha, Mustafa Sabah et al., "High payload image steganography scheme with minimum distortion based on distinction grade value method", Multimedia Tools and Applications, vol. 81, No. 18 [retrieved Aug. 10, 2023]. Retrieved from the Internet <https://doi.org/10.1007/s11042-022-12691-9>., Jul. 1, 2022, 34 Pages.

Tancik, Matthew, "StegaStamp: Invisible Hyperlinks in Physical Photographs", Cornell University arXiv, arXiv.org [retrieved Aug. 10, 2023]. Retrieved from the Internet <https://arxiv.org/pdf/1904.05343.pdf>., Mar. 26, 2020, 13 Pages.

Volkhonskiy, Denis et al., "Steganographic generative adversarial networks", Cornell University arXiv, arXiv.org [retrieved Aug. 11, 2023]. Retrieved from the Internet <https://arxiv.org/pdf/1703.05502.pdf>., Oct. 7, 2019, 15 Pages.

Wan, Wenbo et al., "A comprehensive survey on robust image watermarking", Neurocomputing, vol. 488, No. C [retrieved Aug. 10, 2023]. Retrieved from the Internet <https://pure.port.ac.uk/ws/files/50956558/Survey_on_Watermarking_pp.pdf>., Jun. 1, 2022, 26 Pages.

Weng, Xinyu et al., "High-Capacity Convolutional Video Steganography with Temporal Residual Modeling", ICMR '19: Proceedings of the 2019 on International Conference on Multimedia Retrieval [retrieved Nov. 7, 2023]. Retrieved from the Internet <https://doi.org/10.1145/3323873.3325011>, Jun. 2019, 9 pages.

Westfeld, Andreas et al., "F5—A Steganographic Algorithm", In: Moskowitz, I.S. (eds) Information Hiding. IH 2001. Lecture Notes in Computer Science, vol. 2137. Springer, Berlin, Heidelberg. <https://doi.org/10.1007/3-540-45496-9_21>, Oct. 24, 2001, 14 pages.

Wolfgang, R.B. et al., "A watermark for digital images", Proceedings of 3rd IEEE International Conference on Image Processing [retrieved Aug. 10, 2023]. Retrieved from the Internet <https://www.cerias.purdue.edu/assets/pdf/bibtex_archive/2001-67.pdf>., Sep. 1996, 5 Pages.

Wu, Pin et al., "StegNet: Mega Image Steganography Capacity with Deep Convolutional Network", Cornell University arXiv, arXiv.org [retrieved Aug. 10, 2023]. Retrieved from the Internet <https://arxiv.org/pdf/1806.06357.pdf>., Jun. 17, 2018, 15 Pages.

Yu, Ning et al., "Artificial Fingerprinting for Generative Models: Rooting Deepfake Attribution in Training Data", Cornell University, arXiv Preprint, arxiv.org [retrieved Nov. 7, 2023]. Retrieved from the Internet <https://arxiv.org/pdf/2007.08457.pdf>, Jul. 16, 2020, 15 pages.

Yu, Ning et al., "Responsible Disclosure of Generative Models Using Scalable Fingerprinting", Cornell University, arXiv Preprint, arxiv.org [retrieved Nov. 10, 2023]. Retrieved from the Internet <https://arxiv.org/pdf/2012.08726.pdf>, Dec. 16, 2020, 16 pages.

Zhang, Kevin Alex et al., "Robust Invisible Video Watermarking with Attention", Cornell University arXiv, arXiv.org [retrieved Aug. 10, 2023]. Retrieved from the Internet <https://arxiv.org/pdf/1909.01285.pdf>., Sep. 3, 2019, 11 Pages.

Zhang, Lvmin et al., "Adding Conditional Control to Text-to-Image Diffusion Models", Cornell University, arXiv Preprint, arxiv.org [retrieved Nov. 10, 2023]. Retrieved from the internet <https://arxiv.org/pdf/2302.05543.pdf>, Feb. 10, 2023, 12 pages.

Zhang, Richard et al., "The Unreasonable Effectiveness of Deep Features as a Perceptual Metric", Cornell University arXiv, arXiv.org [retrieved Aug. 11, 2023]. Retrieved from the Internet <https://arxiv.org/pdf/1801.03924.pdf>., Apr. 10, 2018, 14 Pages.

Zhang, Xu et al., "Discovering Image Manipulation History by Pairwise Relation and Forensics Tools", IEEE Journal of Selected Topics in Signal Processing, vol. 14, No. 5 [retrieved Nov. 28, 2023]. Retrieved from the Internet <https://doi.org/10.1109/JSTSP.2020.2999827>, Jun. 3, 2020, 12 pages.

Zhou, Zhi Li et al., "Coverless Information Hiding Based on Bag-of-Words Model of Image", Journal of Applied Sciences, vol. 34, No. 5 [retrieved Nov. 28, 2023]. Retrieved from the Internet <https://doi.org/10.3969/j.issn.0255-8297.2016.05.005>, 2016, 10 pages.

Zhou, Zhili et al., "Coverless Image Steganography Without Embedding", In: International Conference on Cloud Computing and Security [retrieved Nov. 28, 2023]. Retrieved from the Internet <https://doi.org/10.1007/978-3-319-27051-7_11>, Aug. 2015, 10 pages.

Zhou, Zhili et al., "Encoding multiple contextual clues for partial-duplicate image retrieval", Pattern Recognition Letters, vol. 109 [retrieved Dec. 14, 2023]. Retrieved from the Internet <https://doi.org/10.1016/j.patrec.2017.08.013>, Jul. 15, 2018, 9 pages.

Zhu, Jiren et al., "HiDDeN: Hiding Data with Deep Networks", Proceedings of the European Conference on Computer Vision [retrieved Aug. 10, 2023]. Retrieved from the Internet <https://openaccess.thecvf.com/content_ECCV_2018/papers/Jiren_Zhu_HiDDeN_Hiding_Data_ECCV_2018_paper.pdf>., Sep. 8, 2018, 16 Pages.

\* cited by examiner

LATENT SPACE BASED STEGANOGRAPHIC IMAGE GENERATION

BACKGROUND

Steganography is the practice of concealing information within various types of content and is useful for a wide range of applications, such as covert communication, content tracking, etc. For example, steganography techniques are used in digital watermarking to include information as a digital "watermark" within a digital image. Thus, the digital watermark is hidden within the digital image and later recoverable to support various functionalities such as ownership verification. However, conventional approaches to generating steganographic content have a limited capacity with respect to an amount of hidden information that can be included in a digital image without distorting the underlying image. Further, conventional approaches are susceptible to transformations applied to digital images, and thus changes to the image cause the digital watermark to be corrupted which limits the utility of such methods and offsets the benefits associated with steganography.

SUMMARY

Techniques for latent space based steganographic image generation are described that embed a secret within a latent space of an autoencoder to generate a steganographic image. For example, a processing device receives a digital image and a secret. The secret includes a bit string that represents one or more characters, such as a message to be hidden within the digital image. An encoder of the autoencoder generates an embedding of the digital image that includes latent code in a latent space. A secret encoder is trained and utilized to generate an embedding of the secret to act as a latent offset to the latent code. The processing device further leverages a pretrained decoder of the autoencoder to generate a steganographic image that includes the secret and is visually indiscernible from the digital image based on the embedding of the secret and the embedding of the digital image.

The processing device is then operable to output the steganographic image, such as to share the steganographic image online. Further, the processing device is configured to recover the secret from the steganographic image, such as by training and leveraging a secret decoder to extract the secret. In various examples, training of the secret decoder and the secret encoder includes using a noise model to increase robustness, e.g., resilience against various perturbations applied to the steganographic image. Thus, the techniques described herein provide a modality for generating high-quality steganographic images that imperceptibly include hidden information and are robust against image transformations.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
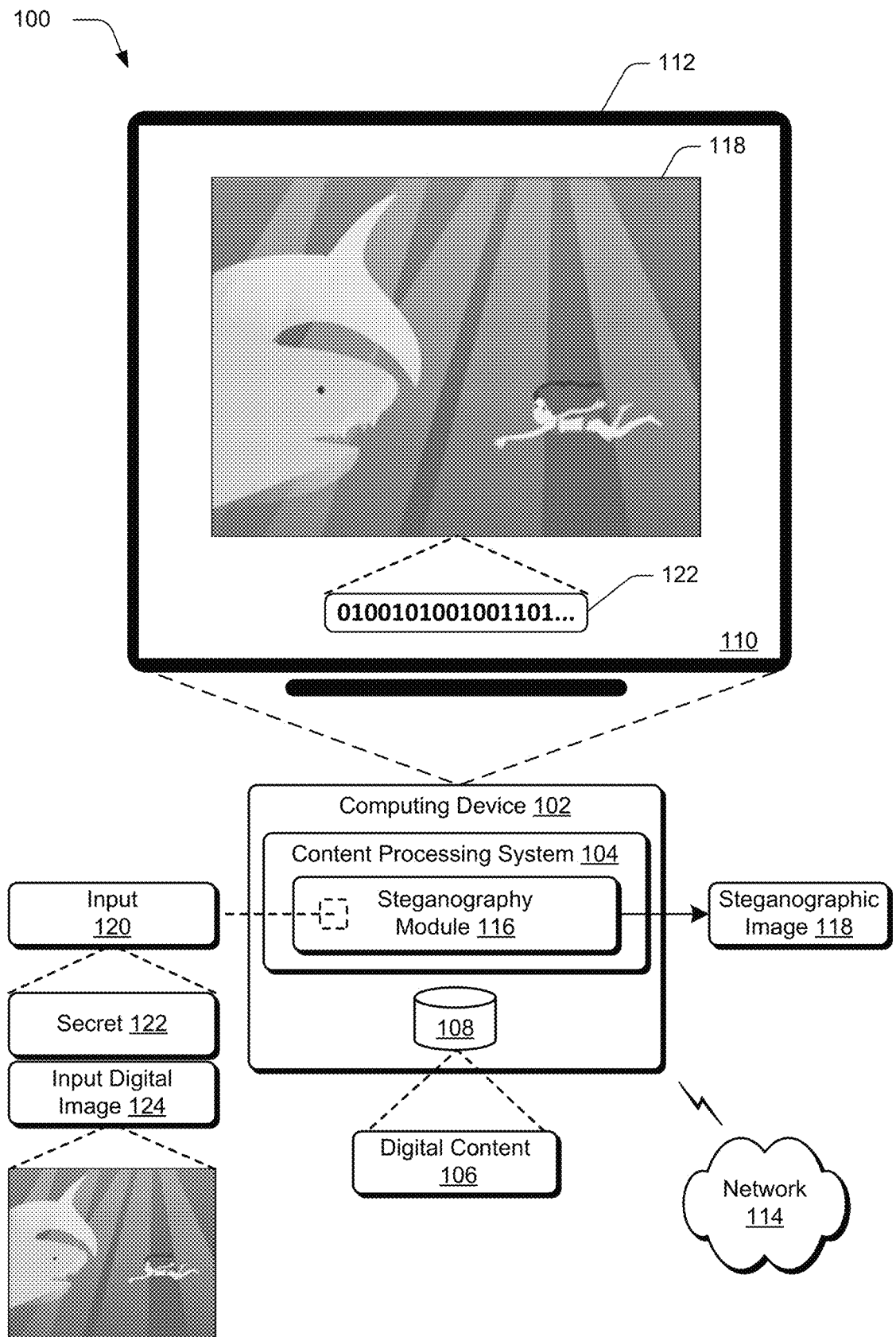
FIG. 1 is an illustration of a digital medium environment in an example implementation that is operable to employ the latent space based steganographic image generation techniques described herein.

Steganography techniques and systems are designed to incorporate hidden information, referred to as a "payload," within various forms of digital media such as a "cover" image. The goal of steganography techniques is to generate a steganographic image that includes the payload within the cover image without noticeably altering visual properties of the cover image, while ensuring the payload can accurately be recovered later. However, as the size and/or length of the payload increases, the quality of the steganographic image diminishes, e.g., the presence of the payload becomes noticeable. Thus, conventional steganography techniques are limited by payload size, which limits functional applications of such techniques.

Further, conventional steganography techniques often fail to maintain robustness. For instance, such techniques struggle to preserve the payload as transformations are applied to the steganographic image. Rather, when image transformations such as filters, compression, resizing, and format conversions are applied to conventional steganographic images, the hidden information is often exposed, corrupted, and/or lost entirely. Thus, conventional approaches struggle with preserving image quality (e.g., imperceptibility of the payload), limited length of the payload, and robustness against various perturbations, e.g., editing, reposting, and/or attempts to remove the secret.

For instance, one conventional approach called least significant bit (LSB) embedding includes embedding a payload in a lowest order of bits of an input image. However, even minor modifications to the embedded image cause the payload to be lost or corrupted. Several machine learning approaches to steganography have been proposed, however these techniques further struggle to balance robustness with image quality and secret length.

Accordingly, techniques and systems to generate steganographic images are described in which a secret is embedded into latent code generated by one or more autoencoders. Techniques and systems to extract the secret from the steganographic image are further described to support a variety of functionality. By embedding the secret into the latent code, these techniques overcome the limitations of conventional techniques and support enhanced secret length and robustness against perturbations while maintaining image quality.

Consider an example in which a user authors a digital image of a whale and wishes to include authorship information such as the user's name as well as the time and place that the digital image was authored. One conventional approach to do so would be to include the authorship information as metadata, however such metadata is easily "stripped" from the digital image, either intentionally as a result of attackers or inadvertently as the image is altered or redistributed, e.g., shared online. Other conventional steganography techniques, such as least significant bit embedding as well as various machine learning based approaches, similarly struggle with robustness against image perturbations.

To overcome these limitations, a processing device implements a content processing system to generate a steganographic image with a secret hidden using a latent space of an autoencoder. Generally, the autoencoder is pretrained to generate representations of input data, e.g., digital images, as well as reconstruct the original input data based on the representations. For instance, the autoencoder includes an encoder that is configured to compress a digital image into a compact representation (e.g., latent code) that captures essential features of the digital image and a decoder that is configured to decompress the representation to reconstruct the digital image.

Accordingly, to generate a steganographic image, the content processing system receives an input image as well a secret to be hidden within the input image. Continuing with the above example, the input image is the image of the whale and the secret is the authorship information. In this example, the secret is received as text, and the content processing system is operable to convert the text to a bit string to represent characters of the text.

The content processing system then leverages the pretrained encoder of the autoencoder to generate an embedding of the input image, i.e., an image embedding, that includes latent code. The latent code, for instance, includes variables, parameters, and/or values that represent features and characteristics of the input image in a compressed representation. The content processing system is further operable to train and subsequently utilize a secret encoder to generate an embedding of the secret, i.e., a secret embedding. The secret embedding is used as a latent offset to the latent code such that the secret embedding is incorporated into the latent code however does not have an effect on visual features of an image generated based on the latent code.

The content processing system then leverages the pretrained decoder of the autoencoder to generate the steganographic image based on the image embedding and the secret embedding. The decoder, for instance, is pretrained to receive an embedding that includes latent code and generate a digital image based on the latent code. Thus, the steganographic image includes the secret that is included in the latent code and maintains visual consistency with the input image. That is, the steganographic image is visually indiscernible by the human eye from the image of the whale. Because the secret is encoded to the latent space, the amount of information representable by the secret without reducing image quality is increased relative to conventional steganography approaches.

Once generated, the content processing system is operable to output the steganographic image, such as for display in a user interface and/or to publish the steganographic image. Consider that in this example, the user posts the steganographic image that depicts the whale to a social media website. The steganographic image is reposted and shared multiple times, as well as edited by various third parties. Using conventional techniques, such perturbations to repost and edit the steganographic image would result in corruption of the hidden information, e.g., the secret, and the authorship information would be unrecoverable.

However, because the techniques described herein leverage a pretrained autoencoder to embed the secret within the latent code, the steganographic image is robust against these perturbations. Accordingly, the content processing system further includes a secret decoder that is configured to extract the secret from the steganographic image. During training of the secret encoder and decoder, a noise model is used to further enhance the robustness, e.g., the resiliency against image perturbations. Thus, the extracted secret from the steganographic image by the secret decoder contains the authorship information generated by the user and the user is able to validate the steganographic image is the one created by the user.

Once extracted, the content processing system is configured to output the characters included in the secret, e.g., the authorship information. In this way, the techniques described herein provide a modality for generating high-quality steganographic images that imperceptibly include hidden information and are robust against image transformations. Further discussion of these and other examples and advantages are included in the following sections and shown using corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the latent space based steganographic image generation techniques described herein. The illustrated environment 100 includes a computing device 102, which is configurable in a variety of ways.

The computing device 102, for instance, is configurable as a processing device such as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 12.

The computing device 102 is illustrated as including a content processing system 104. The content processing system 104 is implemented at least partially in hardware of the computing device 102 to process and transform digital content 106, which is illustrated as maintained in storage 108 of the computing device 102. Such processing includes creation of the digital content 106, modification of the digital content 106, and rendering of the digital content 106 in a user interface 110 for output, e.g., by a display device 112. Although illustrated as implemented locally at the computing device 102, functionality of the content processing system 104 is also configurable in whole or in part via functionality available via the network 114, such as part of a web service or "in the cloud."

An example of functionality incorporated by the content processing system 104 to process the digital content 106 is illustrated as a steganography module 116. The steganography module 116 is configured to generate a steganographic image 118 based on an input 120 that includes a secret 122 and an input digital image 124. Generally, the secret 122 includes one or more bits, e.g., a bit string that represents one or more characters. For instance, the secret 122 represents a "hidden message" to be included in the steganographic image 118. The input digital image 124 is configurable in a variety of ways and/or file formats, such as a JPEG, PNG, GIF, raster image, vector image, etc. While in this example the input 120 includes an input digital image 124, a variety of types of digital content 106 are considered such as video, audio, virtual reality/augmented reality digital content, animations, etc.

In general, the steganography module 116 generates the steganographic image 118 to be visually indiscernible from the input digital image 124 and include the secret 122. Consider that in the illustrated example, a user generates the input digital image 124, which depicts a shark and a swimmer. The user wishes to generate a steganographic image 118 that includes a secret 122 with content provenance information, e.g., authorship information associated with the input digital image 124.

To do so, the steganography module 116 leverages a pretrained autoencoder, such as an encoder of a convolutional neural network, to generate an embedding of the input digital image 124. The embedding, for instance, is a latent code representation of the input digital image 124. The steganography module 116 further trains and utilizes a lightweight encoder to generate an embedding of the secret 122. The lightweight encoder is configured to generate the embedding of the secret such that it can be incorporated into the latent code without visually impacting an appearance of the steganographic image 118.

Based on the embedding of the input digital image 124 and the embedding of the secret 122, the steganography module 116 leverages a pretrained decoder, such as a decoder of the convolutional neural network, to generate the steganographic image 118. As depicted in the illustrated example, the steganographic image 118 is output for display in the user interface 110 and is visually indiscernible by the human eye from the input digital image 124. The steganographic image 118 further includes the secret 122 as embedded within the latent code used to generate the steganographic image 118. By including the secret within the latent code used to generate the steganographic image 118, the techniques described herein increase the size of the secret 122 that is hidable without impacting the visual quality of the steganographic image 118. Further, the techniques described herein support robust steganographic image 118 generation, such that the secret 122 is recoverable despite undergoing various image perturbations.

By way of example, the steganography module 116 is further operable to recover the secret 122 from the steganographic image 118. Consider that the user posts the steganographic image 118 online, such as to a social media platform. The steganographic image 118 undergoes various perturbations, such as actions by other individuals to repost and/or edit the steganographic image 118. Conventional techniques are susceptible to such perturbations which disrupt hidden information and, in some cases, remove the hidden information altogether.

However, using the techniques described herein, the steganography module 116 trains and utilizes a lightweight decoder to extract the secret 122 from the steganographic image 118. Because the lightweight decoder is trained to withstand image perturbations and because the secret 122 is included in latent code used to generate the steganographic image 118, the techniques described herein support recovery of the secret despite image transformations and perturbations applied to the steganographic image 118. Further discussion of these and other advantages is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Latent Space Based Steganographic Image Generation

Figure 10:
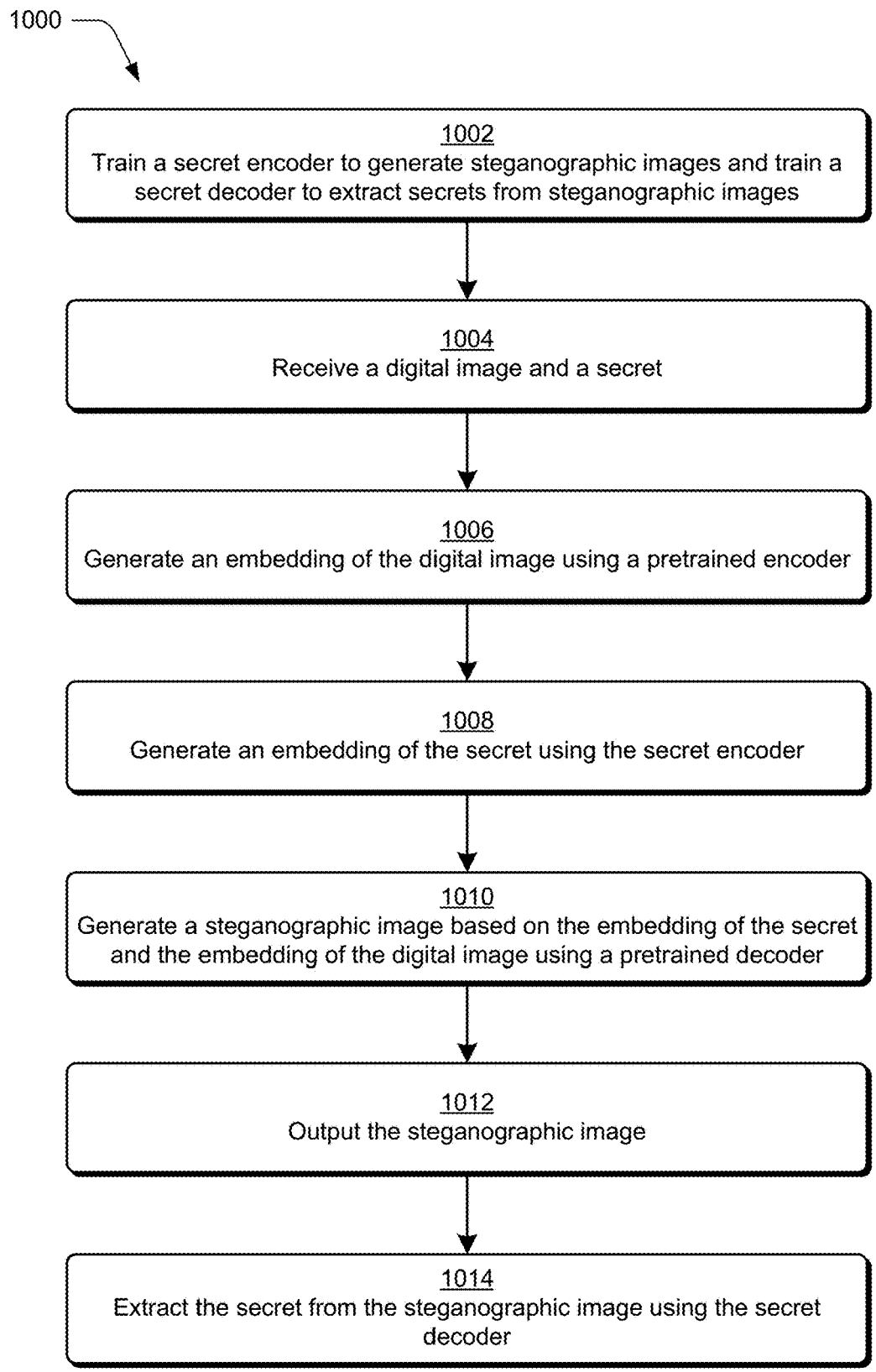
FIG. 10 is a flow diagram depicting an algorithm as a step-by-step procedure in an example implementation that is performable by a processing device to generate a steganographic image and extract a secret from the steganographic image.
Figure 11:
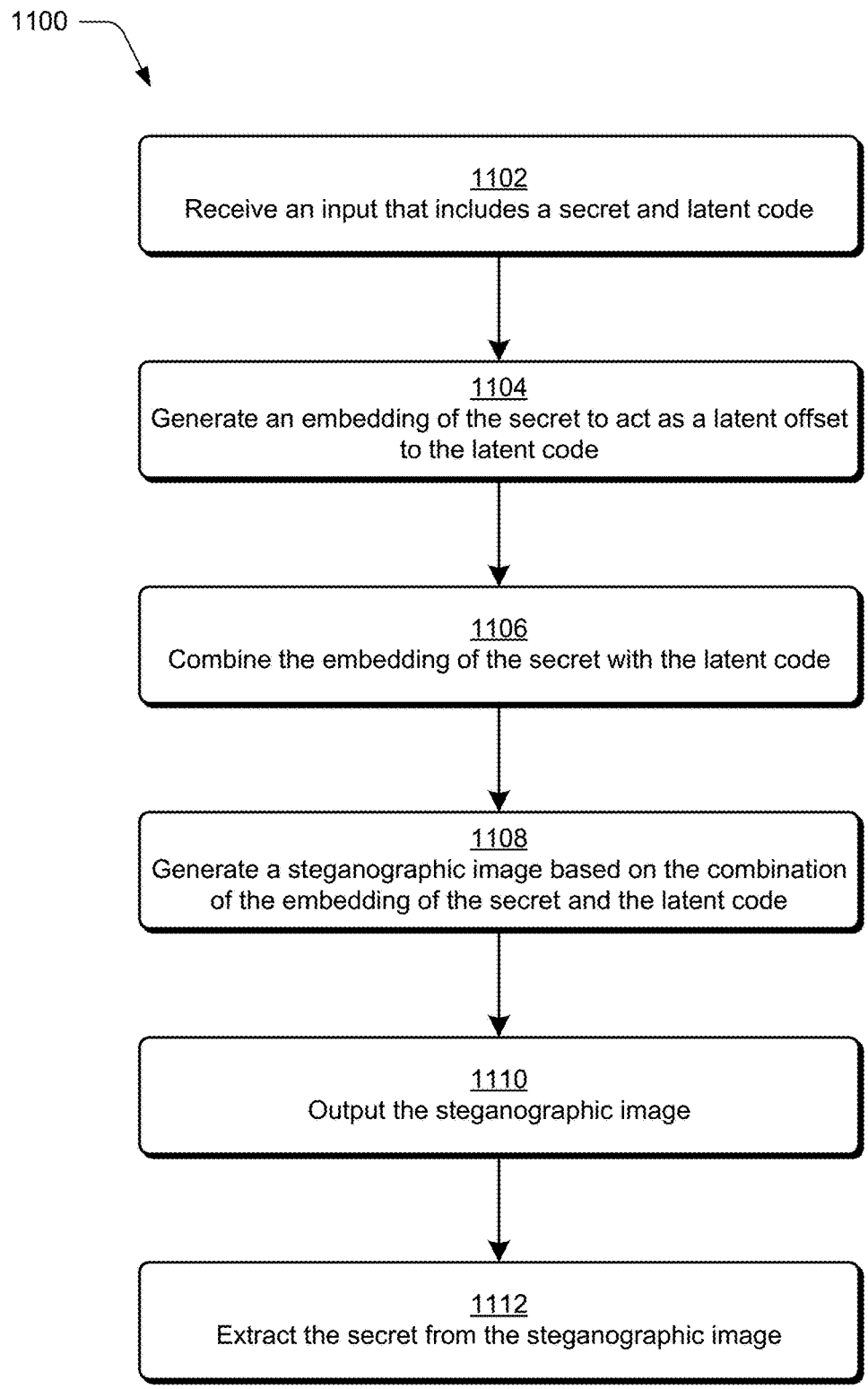
FIG. 11 is a flow diagram depicting an algorithm as a step-by-step procedure in an example implementation that is performable by a processing device to generate a coverless steganographic image.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-9 in parallel with the procedure 1000 of FIG. 10 and the procedure 1100 of FIG. 11.

Figure 2:
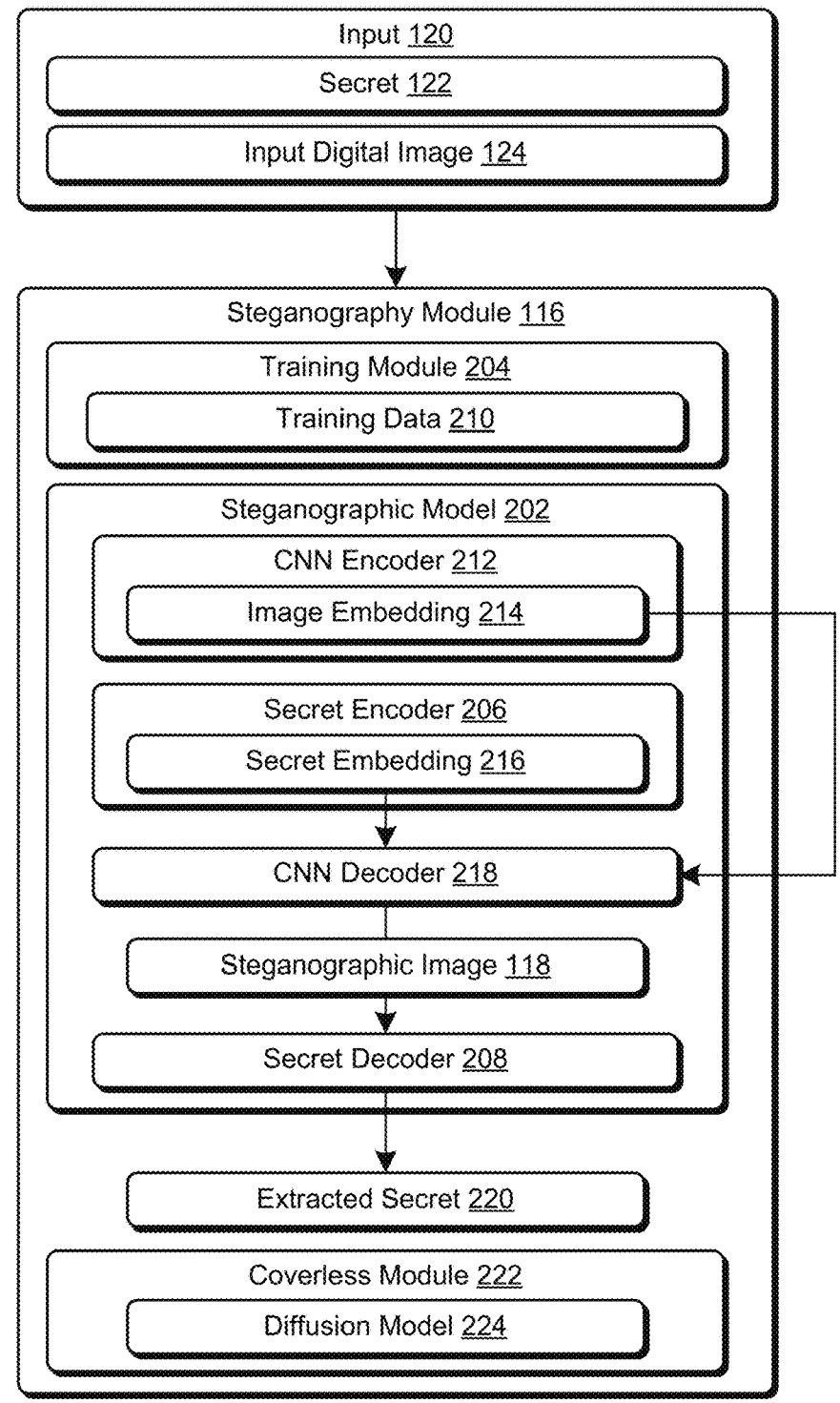
FIG. 2 depicts a system in an example implementation showing operation of a steganography module in greater detail.

FIG. 2 depicts a system 200 in an example implementation showing operation of a steganography module 116 of FIG. 1 in greater detail. Generally, the steganography module 116 is operable to train a steganographic model 202 to generate a steganographic image 118 that includes one or more secrets 122. Further, the steganography module 116 is operable train the steganographic model 202 to receive a steganographic image 118 and extract one or more secrets 122 that are included in the steganographic image 118. In the following discussion, training of the steganographic model 202 is described followed by example implementations of a trained steganographic model 202. Further discussed are examples of coverless steganography using the techniques described herein.

Training a Secret Encoder and Secret Decoder of a Steganographic Model

In an example, the steganography module 116 includes a training module 204 that is operable to train the steganographic model 202. For instance, the training module 204 trains a secret encoder 206 of the steganographic model 202 to generate steganographic images 118 and trains a secret decoder 208 of the steganographic model 202 to extract one or more secrets 122 from steganographic images 118 (block 1002). To do so, the training module 204 leverages training data 210 that includes one or more training pairs. Each training pair, for instance, includes a training digital image and a training secret.

The training secrets include a bit string, e.g., a sequence of binary digits. The training module 204 is operable to randomly generate the training secrets such as to increase diversity of the training data 210. The training module 204 is configured to generate training secrets of a variety of lengths (e.g., a number of digits included in respective training secrets) such as between 50-200 bits. In various examples, the training secrets are representative of one or more characters. As further described below, the techniques described herein support increased secret length relative to conventional techniques without sacrificing image quality.

The training images are representative of a variety of types of digital content, such as still images, video content, VR/AR content, etc. In one example, the training module 204 sources the training images from a training image dataset, such as a MIRFlickR dataset as described by Huiskes, et al. *The MIRFlickR retrieval evaluation*. In Proceedings of the 1st ACM International Conference on Multimedia Information Retrieval, pp. 39-43, (2008). This is by way of example and not limitation, and a variety of suitable sources of training images are contemplated.

Figure 3:
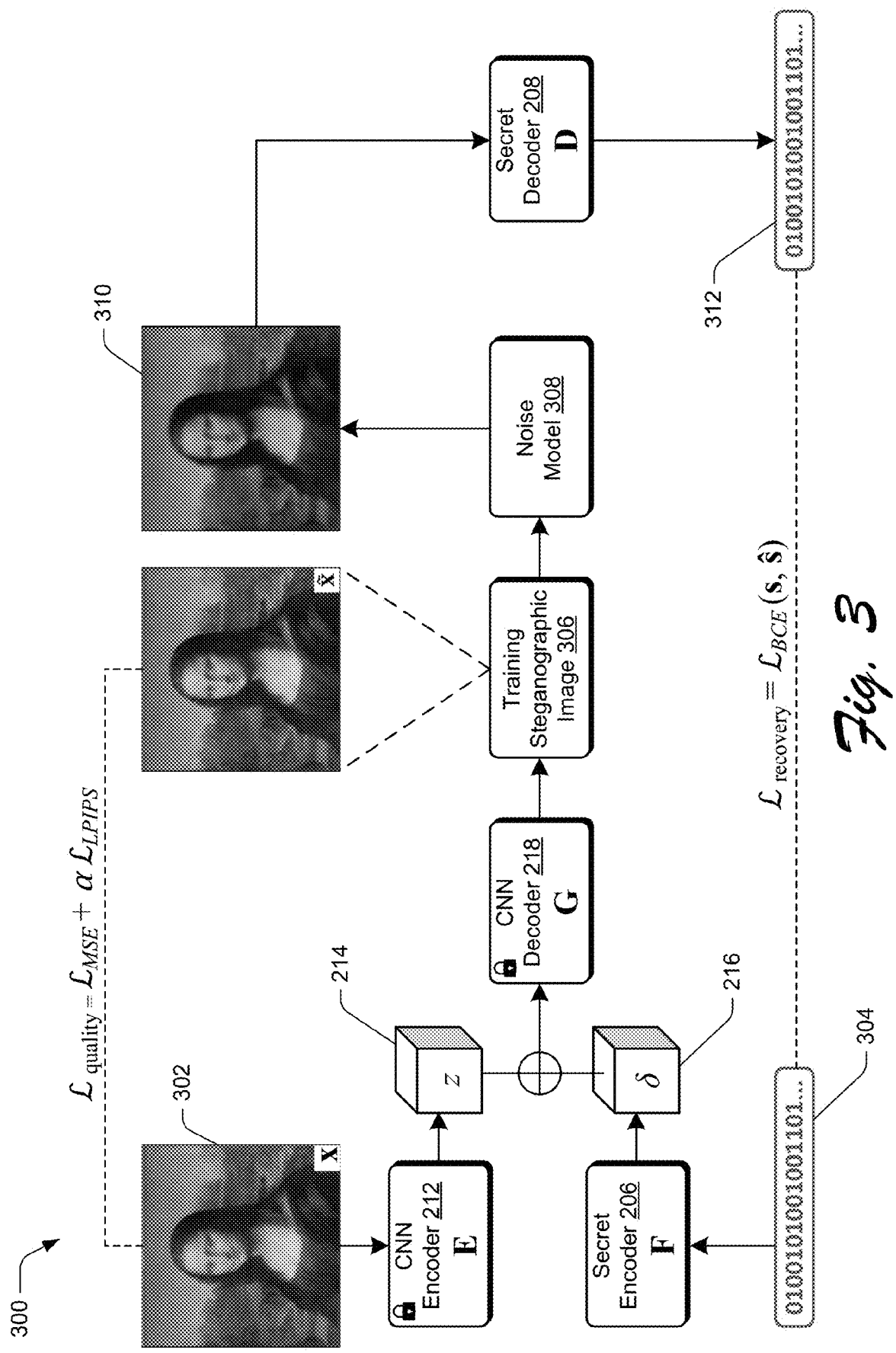
FIG. 3 depicts an example architecture to train a secret encoder and a secret decoder of a steganographic model.

FIG. 3 depicts an example 300 to train the secret encoder 206 and the secret decoder 208 of the steganographic model 202. In this example, the training module 204 obtains a plurality of training images (e.g., 100,000 digital images) an example of which is the illustrated training image 302. The training module 204 is further operable to randomly crop the training images, such as to a resolution of 256×256 pixels. The training module 204 randomly generates a plurality of training secrets, e.g., the illustrated training secret 304. In this example, the training secrets have a bit length of 100 bits, however a variety of bit lengths for the training secrets are considered.

The training module 204 leverages a pretrained encoder of an autoencoder such as a CNN encoder 212 to generate an image embedding 214 of the training image 302. In some examples, the autoencoder is a convolutional neural network ("CNN") that is pretrained using unsupervised learning. Generally, the CNN encoder 212 is pretrained to receive an input image and generate an embedding that includes latent code in a latent space to represent the input image. The latent code, for example, includes variables, parameters, and/or values that define features and/or characteristics of the input image in a compressed representation. In some examples, the embedding is represented as a multi-dimensional vector, e.g., a 5112-dimensional vector. In one or more examples, the autoencoder is a VQGAN autoencoder such as described by Esser, et al. *Taming transformers for high-resolution image synthesis*, (2020) and the CNN encoder 212 is included in the VQGAN autoencoder.

In the illustrated example, the CNN encoder 212 is denoted E and is depicted as "locked" meaning that parameters of the CNN encoder 212 are not updated during the training process. Rather, the CNN encoder 212 is pretrained, such as using unsupervised learning. The CNN encoder 212 is configured to receive an image x of size H×W×C, e.g., the training image 302, and map the image into latent code $z=E(x)\in \mathbb{R}^{H'\times W'\times C}$. In some examples, one or more of H' and/or W' are a magnitude smaller than a resolution of the image, such as four times or eight times smaller. In this way, the CNN encoder 212 generates the image embedding 214 to be a compressed representation of the training image 302.

The training module 204 further trains and leverages a secret encoder 206, denoted F in the illustrated example, to generate a secret embedding 216 that corresponds to an input bit string, e.g., for the training secret 304. The secret embedding 216, for instance, is usable as a latent offset to the latent code of the image embedding 214. For example, the latent offset represents a modification to the latent code that includes relevant information about the training secret 304, however, does not alter visual properties of an image generated based on the latent code. In the example, the training secret 304 is represented as $s\in\{0,1\}^L$ where L is the length in bits of the training secret 304. The secret embedding 216 is defined as $\delta=F(s)\in\mathbb{R}^{H'\times W'\times C}$. Generally, the secret encoder 206 is a lightweight encoder that has a relatively small number of parameters, such as 300,000 parameters for a training secret with a length of one-hundred bits.

In one example, the secret encoder 206 includes at least one fully connected layer followed by a sigmoid linear unit (SiLU) as described by Ramachandran, et al. *Swish: A Self-Gated Activation Function*. arXiv:1710.05941, 7(1):5, (2017). The secret encoder 206 is configured to scale the secret embedding 216 to match a dimensionality of the image embedding 214, and in some examples includes a 1×1 convolutional layer. The training module 204 is configured to initialize a weight and a bias of the 1×1 convolutional layer to zero to ensure that δ=0 in the first training iteration, such as to initially replicate the behavior of the pretrained CNN encoder 212.

Based on the image embedding 214 and the secret embedding 216, the training module 204 leverages a pretrained decoder of the autoencoder, such as a CNN decoder 218 to generate a training steganographic image, e.g., the example training steganographic image 306. The training steganographic image 306 thus includes the training secret 304 and is visually similar to the training image 302. Generally, the CNN decoder 218 is pretrained to receive an embedding that includes latent code and generate an image based on the latent code. In one or more examples, the CNN decoder 218 corresponds to the CNN encoder 212. For instance, the CNN decoder 218 is part of the VQGAN autoencoder as described by Esser, et al. *Taming transformers for high-resolution image synthesis*, (2020).

In the illustrated example, the CNN decoder 218 is denoted G and is depicted as "locked" meaning that parameters of the CNN decoder 218 are not updated during the training process similar to the CNN encoder 212. The CNN decoder 218 generates the training steganographic image 306, denoted as x̃, based on the image embedding 214 and the secret embedding 216 such that x̃=G(z+δ). In some examples, the CNN decoder 218 is operable to concatenate the image embedding 214 and the secret embedding 216. Additionally or alternatively, the image embedding 214 and the secret embedding 216 are combined by the training module 204 prior to input to the CNN decoder 218.

The training module 204 then calculates a quality loss based on the training image 302 and the training steganographic image 306. The quality loss, denoted in the illustrated example as $\mathcal{L}_{quality}$, generally represents a visual quality of the training steganographic image 306. In one example, the quality loss is based in part or in whole on a visual similarity and/or difference between the training image 302, which represents a ground truth image, and the training steganographic image 306. The quality loss further represents an "imperceptibility" of the encoded training secret 304, such that incorporation of the training secret 304 does not affect the visual appearance of the steganographic image 118. The training module 204 is configured to minimize the quality loss, such that images generated by the CNN decoder 218 are visually indistinguishable, e.g., by the human eye, from the training image 302.

In various examples, the quality loss is based on one or more of a pixel loss and/or a perceptual loss. For instance, the training module 204 calculates a pixel loss such as a mean squared error ("MSE") loss, denoted $\mathcal{L}_{MSE}$, that measures an average squared difference between a ground truth image (e.g., the training image 302) and a generated image, e.g., the training steganographic image 306. Accordingly, minimizing the MSE loss during training ensures the generated image is visually similar to the reference image in terms of pixel values.

The training module 204 is further operable to calculate a perceptual loss such as a learned perceptual image patch similarity ("LPIPS") loss, denoted $\mathcal{L}_{LPIPS}$. The LPIPS loss measures a perceptual similarity between a ground truth, e.g., the training image 302, and the generated image, e.g., the training steganographic image 306, based on visual content including pixel-level differences as well as high-level visual features. For instance, the LPIPS loss considers aspects of the images such as texture, structure, and/or overall appearance that represent "human-perceived" image quality. Accordingly, the LPIPS loss accounts for perceptual differences between the training image 302 and the training steganographic image 306.

Thus, in one example the quality loss is $\mathcal{L}_{quality} = \mathcal{L}_{LPIPS}(\tilde{x}, x) + \alpha \mathcal{L}_{MSE}$ where $\mathcal{L}_{MSE} = \|\gamma(\tilde{x}) - \gamma(x)\|^2$. In this example, α is a loss weight constant, e.g., 1.5. Further, γ(·) represents a differentiable non-parametric mapping function, such as from an RGB space to a perceptually uniform YUV space. Based on the quality loss, the training module 204 updates parameters of the secret encoder 206, e.g., through backpropagation of gradients of the loss function to reduce the loss throughout the training process.

Once the training steganographic image 306 is generated, the training module 204 utilizes the secret decoder 208 to recover the training secret 304 from the training steganographic image 306. To train the secret decoder 208 to be robust, in some examples the training module 204 further includes a noise model 308 that is operable to apply various perturbations such as noise and/or image transformations to training steganographic images before input to the secret decoder 208. Thus, the images that the secret decoder 208 receives as input during training have been visually and/or non-visually modified, which supports an ability of the secret decoder 208 to withstand image perturbations during inferencing.

A variety of types of perturbations are considered. For example, the noise model 308 is operable to apply one or more differentiable perturbations to training steganographic images, such as additive and/or linear noise, e.g., brightness, saturation, contrast, etc. Additionally or alternatively, the noise model 308 applies one or more perturbations that are approximatable with differentiable transforms such as a jpeg compression and/or non-differentiable perturbations, e.g. spatter. In some examples, the noise model 308 converts non-differentiable perturbations n(·) to additive perturbations such that n(x)=x+[n(x)−x], where [·] is treated as an additive constant. In this way, the noise model 308 enables backpropagation to update parameters of the secret encoder 206 as further described below. In some examples, the one or more image perturbations simulate redistribution of the steganographic image in an online context to enhance an ability of the secret decoder 208 to recover secrets 122 after distribution of a steganographic image 118 in an online environment.

Figure 4:
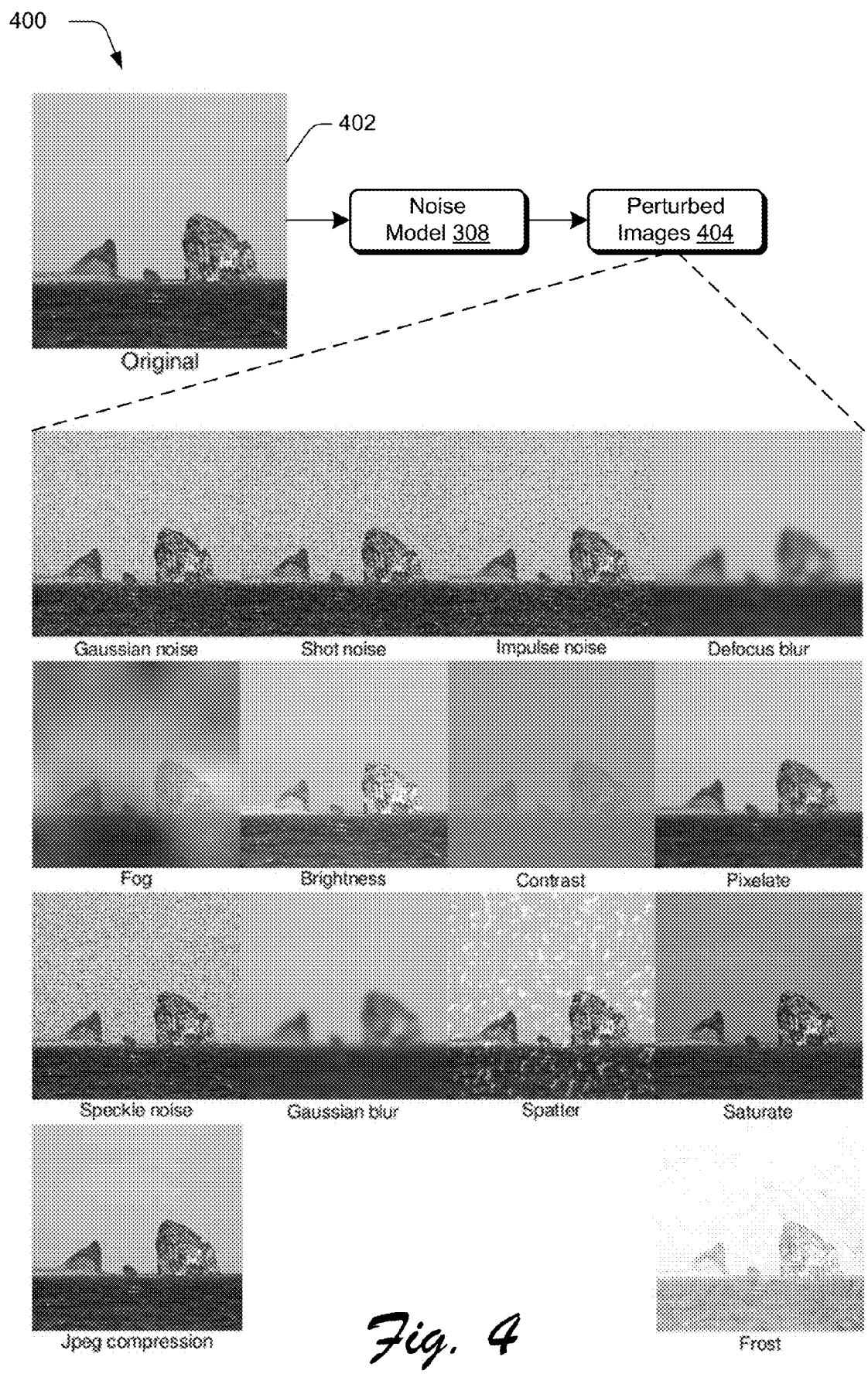
FIG. 4 depicts an example of operations of a noise model used in training the secret encoder and secret decoder to increase robustness.

FIG. 4 depicts an example 400 of operations of the noise model 308. In this example, the noise model 308 receives an input image 402, e.g., a training steganographic image, and generates a plurality of perturbed images 404 with a variety of perturbations applied. The input image 402, for instance, represents an example of a training steganographic image and the perturbed images 404 represent potential inputs to the secret decoder 208 during training. In various implementations, the perturbations are obtained from a noise source library, such as an ImageNet-C library as described by Hendryck, et al. *Benchmarking Neural Network Robustness to Common Corruptions and Perturbations*. In International Conference on Learning Representations, (2019).

As illustrated, the noise model 308 applies a variety of perturbations to the input image 402, such as Gaussian noise, shot noise, impulse noise, defocus blur, fog, brightness, contrast, pixelate, speckle noise, gaussian blur, spatter, saturation, jpeg compression, and frost. The noise model 308 is operable to apply one or more of the perturbations to the training steganographic images, as well as vary a magnitude of the perturbations, such as on a scale of one to five. This is by way of example and not limitation, and a variety of types, combinations, and/or magnitudes of image perturbations are considered. By applying perturbations to training steganographic images, the techniques described herein support robustness of the secret decoder 208 and thus overcome the limitations of conventional techniques in which hidden content is corrupted or lost as a result of image transformations.

Returning to the illustrated example 300 of FIG. 3, the noise model 308 applies one or more perturbations to the training steganographic image 306 to generate a perturbed steganographic image 310. As illustrated, the perturbed steganographic image 310 is a visually modified version of the training steganographic image 306, e.g., the perturbed steganographic image 310 is blurry and has different coloring effects. The secret decoder 208 then extracts a secret, such as a predicted secret 312, from the perturbed steganographic image 310. In an example, the secret decoder 208 is a Resnet50 model such as described by Kaiming He, et al. *Deep Residual Learning for Image Recognition*. In Proceedings of the IEEE conference on computer vision and pattern recognition, pp. 770-778, (2016). The Resnet50 model is modified such that a last layer is configured to output the predicted secret 312, denoted ŝ, of a length of L bits.

The objective of the secret decoder 208 is for the predicted secret 312 to match (e.g., be identical to) the training secret 304. Accordingly, the training module 204 calculates a bit recovery loss $\mathcal{L}_{recovery}$ that measures a similarity and/or difference between the ground truth, e.g., the training secret 304, and the predicted secret 312. In one or more implementations, the recovery loss is based on a binary cross entropy ("BCE") loss that determines similarity between binary bit strings, e.g., of the training secret 304 and the predicted secret 312. In this example $\mathcal{L}_{recovery} = \mathcal{L}_{BCE}(s, \hat{s})$ where s represents the training secret 304.

The recovery loss is used to update parameters of the secret decoder 208 and/or update parameters of the secret encoder 206, e.g., through backpropagation of gradients of the loss function to reduce the loss throughout the training process. Accordingly, the overall loss to train the secret encoder 206 and the secret decoder 208 is represented as $\mathcal{L} = \beta \mathcal{L}_{quality} + \mathcal{L}_{recovery}$ where β is a loss weight that controls a trade-off between image quality and secret recovery. In one or more examples, the training module 204 dynamically updates the loss weight β throughout the training process. For instance, the training module 204 linearly increases the loss weight β as training progresses, such as to initially prioritize secret recovery and later prioritize image quality. In this way, the training module 204 optimizes the training process which further conserves computational resources.

The process illustrated in FIG. 3 is iterated for each training pair included in the training data 210. In this way, the techniques described above support training of a lightweight secret encoder 206 and lightweight secret decoder 208 that are robust against perturbations and capable of hiding variable length secrets within latent code generated by pretrained autoencoders. Further, by leveraging existing functionality of powerful pretrained models, e.g., the CNN encoder 212 and the CNN decoder 218, the techniques described herein reduce computational resource consumption relative to conventional machine learning steganography techniques which are dependent on extensive training processes with large amounts of training data.

Example Implementation of Trained Secret Encoder and Secret Decoder

Once the steganographic model 202 is trained, the steganography module 116 receives an input 120 that includes a secret 122 and an input digital image 124 (block 1004). Generally, the input digital image 124 represents an instance of digital media in which the secret 122 is to be concealed. The input digital image 124 is configurable in a variety of ways and/or file formats, such as a JPEG, PNG, GIF, raster image, vector image, etc. While in this example the input 120 includes an input digital image 124, a variety of types of digital content 106 are considered such as video, audio, VR/AR digital content, animations, etc.

Similar to the above-described training secrets, the secret 122 includes a bit string, e.g., a sequence of binary digits. In various examples, the bit string is representative of text, numbers, images, audio, etc. For example, a secret 122 includes a bit string that represents one or more characters such as alphabetic characters, numeric characters, punctuation characters, whitespace characters, symbol characters, etc. For instance, eight bits of the bit string represent a single character. In this way, the secret 122 is able to represent a "hidden message" to be concealed within the input digital image 124. In some examples, the steganography module 116 receives the secret 122 as one or more characters and converts the one or more characters to a bit string.

In various examples, the secret 122 includes content provenance information associated with the input digital image 124, such as information that identifies one or more of an origin, history, authorship, etc. of the input digital image 124. In one example, the steganography module 116 is operable to determine that the input digital image 124 was created using a generative model such as by using generative artificial intelligence methods. Accordingly, the steganography module 116 generates the secret 122 to indicate that the input digital image 124 was generated using the generative artificial intelligence.

Similarly, the steganography module 116 is configurable to detect whether the input digital image 124 has been manipulated and/or edited such as by using one or more deep learning techniques. The steganography module 116 is then operable to configure the secret 122 to indicate if and/or what types of manipulations have been applied to the input digital image 124. Accordingly, the techniques described herein are further usable to inhibit dissemination of misleading and/or deceptive digital content such as proliferation of "deepfakes" or related synthetic media.

The techniques described herein support generating steganographic images 118 that include secrets 122 of a variety of lengths, e.g., number of digits in the bit string. Conventional steganography techniques are limited by a length of secret, and experience degraded image quality for secrets over a threshold length. Thus, conventional techniques can only represent a limited number of characters. Because the secret 122 is embedded in latent code used to generate the steganographic image 118, as further described below, the techniques described herein overcome conventional limitations and support an increased secret length relative to conventional techniques. Thus, the secret 122 can have a variety of lengths, e.g., 50 to 200 bits or more, and represent an increased number of characters. For example, a bit string of 100 bits represents twelve characters, a bit string of 200 bit represents twenty-five characters, and so forth.

Based on the input 120, the steganography module 116 is operable to generate an embedding of the digital image, e.g., the image embedding 214, using a pretrained encoder such as the CNN encoder 212 (block 1006). As described above with respect to the training process, the CNN encoder 212 is pretrained to receive an input image, e.g., the input digital image 124, and generate an embedding that includes latent code to represent the input image. Generally, the latent code includes variables, parameters, and/or values that define features and/or characteristics of the input digital image 124 in a compressed representation within a latent space of the autoencoder. In some examples, the embedding is represented as a multi-dimensional vector, e.g., a 5112-dimensional vector. In one or more examples, the CNN encoder 212 is an encoder of a VQGAN autoencoder such as described by Esser, et al. *Taming transformers for high-resolution image synthesis*, (2020).

The steganography module 116 further generates an embedding of the secret, e.g., the secret embedding 216, using the secret encoder 206 (block 1008). The secret embedding 216 represents a latent offset to be combined with latent code the image embedding 214. To do so, the secret encoder 206 generates the secret embedding 216 with a dimensionality that corresponds to a dimensionality of the image embedding 214. The secret encoder 206 is trained in accordance with the techniques described above to map the secret embedding 216 to the latent space of the CNN encoder 212 independent of the input digital image 124. That is, the secret embedding 216 is able to be incorporated into any latent code representative of an input image without visually impacting the appearance of the input image. Encoding the secret 122 to the latent code of latent space supports increased secret length and further reduces perceptual distortions when generating steganographic images.

The steganographic model 202 then generates a steganographic image 118 based on the image embedding 214 and the secret embedding 216 by using a pretrained decoder such as the CNN decoder 218 (block 1010). The steganographic image 118 is visually indiscernible from the input digital image 124, and in some examples is visually identical, as viewed by the human eye, to the input digital image 124. The steganographic image 118 further includes the secret 122, however does not include detectable perceptual distortions due to the presence of the encoded secret 122.

As described above with respect to the training process, the CNN encoder 212 is pretrained to receive an embedding that includes latent code and generate a digital image based on the latent code. In one or more examples, the CNN decoder 218 corresponds to the CNN encoder 212. For instance, the CNN decoder 218 is a decoder of a VQGAN autoencoder as described by Esser, et al. *Taming transformers for high-resolution image synthesis*, (2020).

In some examples, the image embedding 214 and the secret embedding 216 are combined before receipt by the CNN decoder 218. For instance, the steganographic model 202 incorporates the secret embedding 216 into the latent code generated by the CNN encoder 212 prior to input to the CNN decoder 218. Additionally or alternatively, the CNN decoder 218 receives both the image embedding 214 and the secret embedding 216 and generates the steganographic image 118 based on both embeddings. The secret embedding 216 and the image embedding 214 are combinable using one or more suitable mechanisms, e.g., concatenation, element-wise addition and/or averaging, linear combination, interpolation, etc.

Once generated, the steganography module 116 is operable to output the steganographic image 118 (block 1012). For instance, the steganography module 116 causes the steganographic image 118 to be displayed, such as in a user interface 110 of a display device 112. In some examples, the steganography module 116 deploys the steganographic image 118 such as by posting the steganographic image 118 online, communicating the steganographic image 118 to one or more computing devices, etc.

The steganographic model 202 is further operable to extract the secret, e.g., an extracted secret 220, from the steganographic image 118 using the secret decoder 208 (block 1014). As described above with respect to the training process, the secret decoder 208 is generally a "lightweight" decoder such as a modified Resnet50 model described by Kaiming He, et al. *Deep Residual Learning for Image Recognition*. In Proceedings of the IEEE conference on computer vision and pattern recognition, pp. 770-778, (2016). The extracted secret 220 "matches" the secret 122. That is, the extracted secret 220 includes the same bit string as the secret 122.

In some examples, the steganographic image 118 has undergone one or more image transformations, such as deliberate actions to edit the image, and/or incidental transformations. As described above, the secret encoder 206 and the secret decoder 208 are trained to withstand a wide variety of image perturbations using the noise model 308. Further, encoding the secret 122 to the latent space prevents perturbations from corrupting the secret 122. Accordingly, the secret extraction techniques described herein are resilient against deliberate attempts to corrupt and/or remove the secret as well as incidental transformations applied to the steganographic image 118, such as those caused by reposts of the image.

Figure 5:
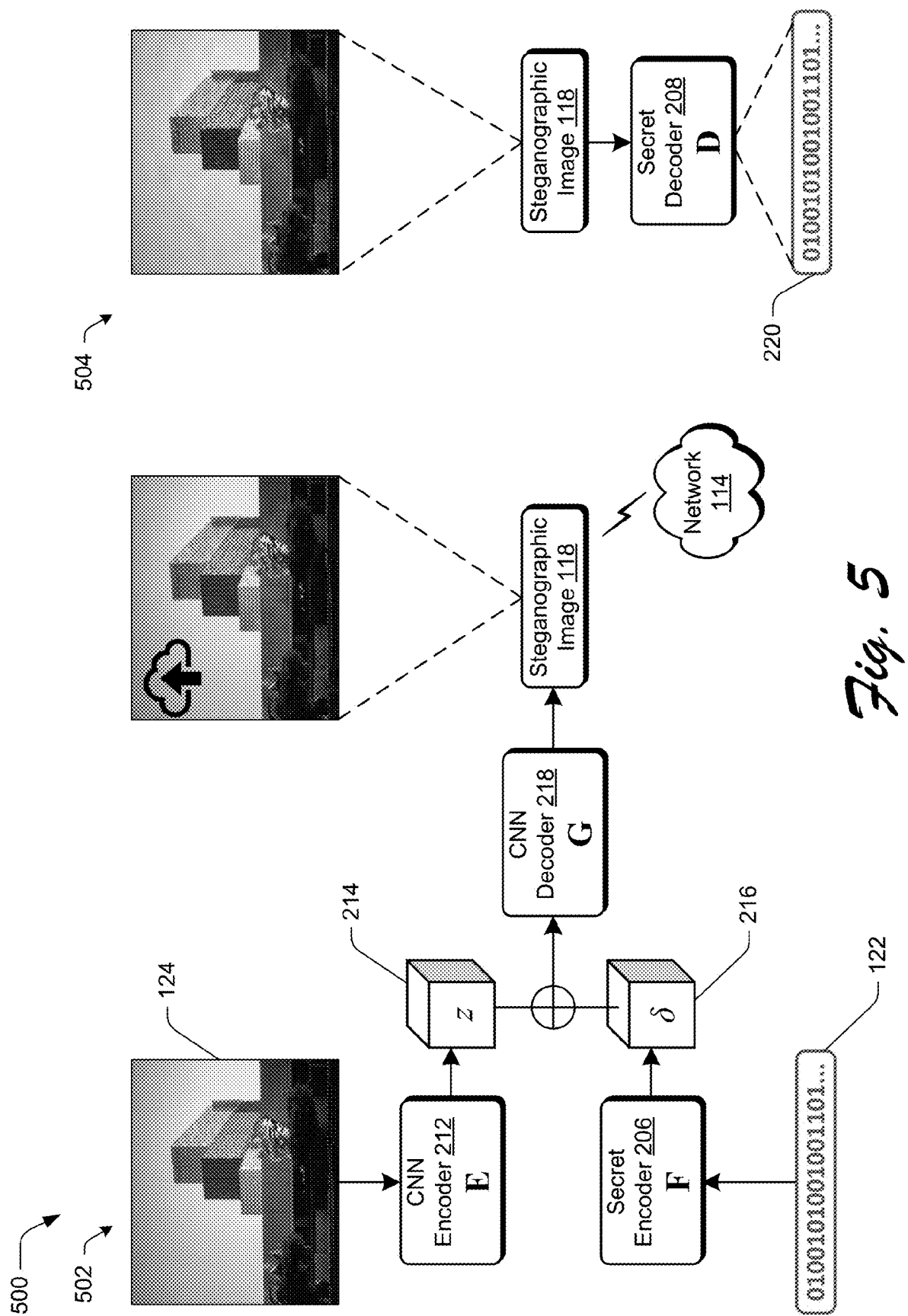
FIG. 5 depicts an example of generation of a steganographic image and recovery of a secret included in the steganographic image.

FIG. 5 depicts an example 500 of generation of a steganographic image 118 and recovery of a secret 122 included in the steganographic image 118 in a first stage 502 and a second stage 504. As depicted in first stage 502, an input digital image 124 and a secret 122 are received. The input digital image 124 depicts a building, and the secret 122 includes authorship information about the input digital image 124. The CNN encoder 212 generates an image embedding 214 that includes latent code, while the secret encoder 206 generates a secret embedding 216 to act as a latent offset to the latent code.

Based on the image embedding 214 and the secret embedding 216, the CNN decoder 218 generates a steganographic image 118 that resembles the input digital image 124 and includes the secret 122. As illustrated, the steganographic image 118 is visually indiscernible from the input digital image 124 however includes a latent representation of the secret 122. In the illustrated example, the steganographic image 118 is then uploaded to the internet, such as to an image sharing social media platform via the network 114.

As shown in second stage 504, the steganography module 116 receives the steganographic image 118, which has undergone several transformations, such as one or more lighting effects, and has been reposted within the social media platform. The secret decoder 208 is operable to extract the secret 122 from the edited steganographic image 118, despite the various transformations. As depicted, the extracted secret 220 and the original secret 122 are identical. In this way, the techniques described herein robustly preserve authorship information included in the secret 122, despite the various image perturbations.

Figure 6:
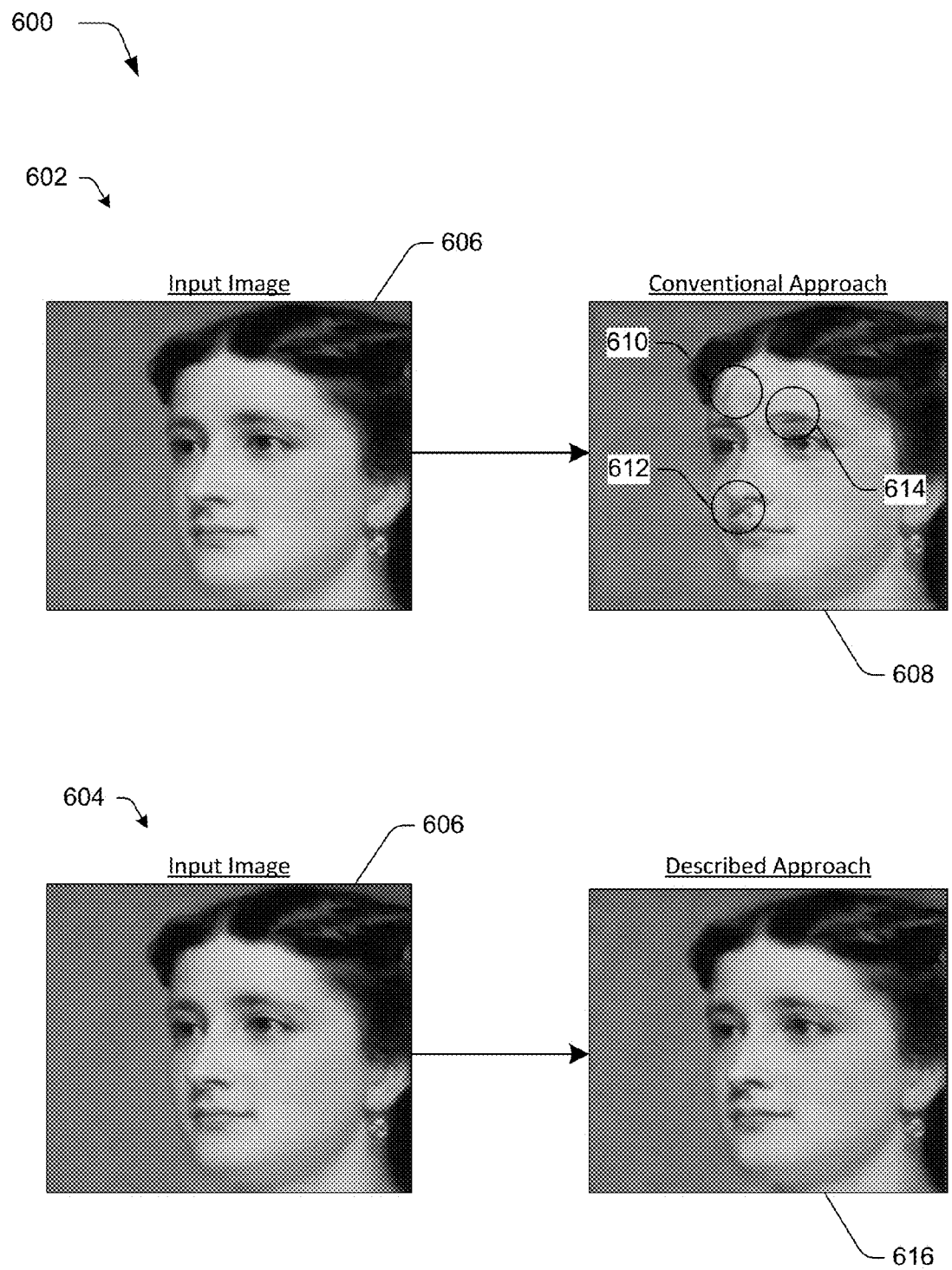
FIG. 6 depicts an example of a comparison between generation of a steganographic image using conventional techniques and using the techniques described herein.

FIG. 6 depicts an example 600 of a comparison between generation of a steganographic image using conventional techniques and using the techniques described herein in a first example 602 and a second example 604. As shown in the first example 602, a secret 122 with a length of one hundred bits is included in a digital image 606 using conventional techniques, e.g., in accordance with the techniques described by Tancik, et al. *StegaStamp: Invisible Hyperlinks in Physical Photographs*. In Proceedings of the IEEE/CVF Conference on Computer Vision and Pattern Recognition, pp. 2117-2126, (2020). This technique suffers from the limitations of conventional approaches, and thus fails to maintain visual quality when generating a steganographic image 608 to include the secret 122. For example, the steganographic image 608 exhibits several visual artifacts, depicted in the illustrated example as circles 610, 612, and 614.

In the second example 604, however, a steganographic image 616 is generated based on the digital image 606 to conceal the secret 122 using the techniques described herein. Because the steganographic image 118 is embedded within a latent space of an autoencoder, such as described above, the steganographic image 616 does not have visual artifacts and is visually imperceptible from the digital image 606. In this way, the techniques described herein overcome the limitations of conventional techniques that are limited by a length of the secret 122.

Figure 7:
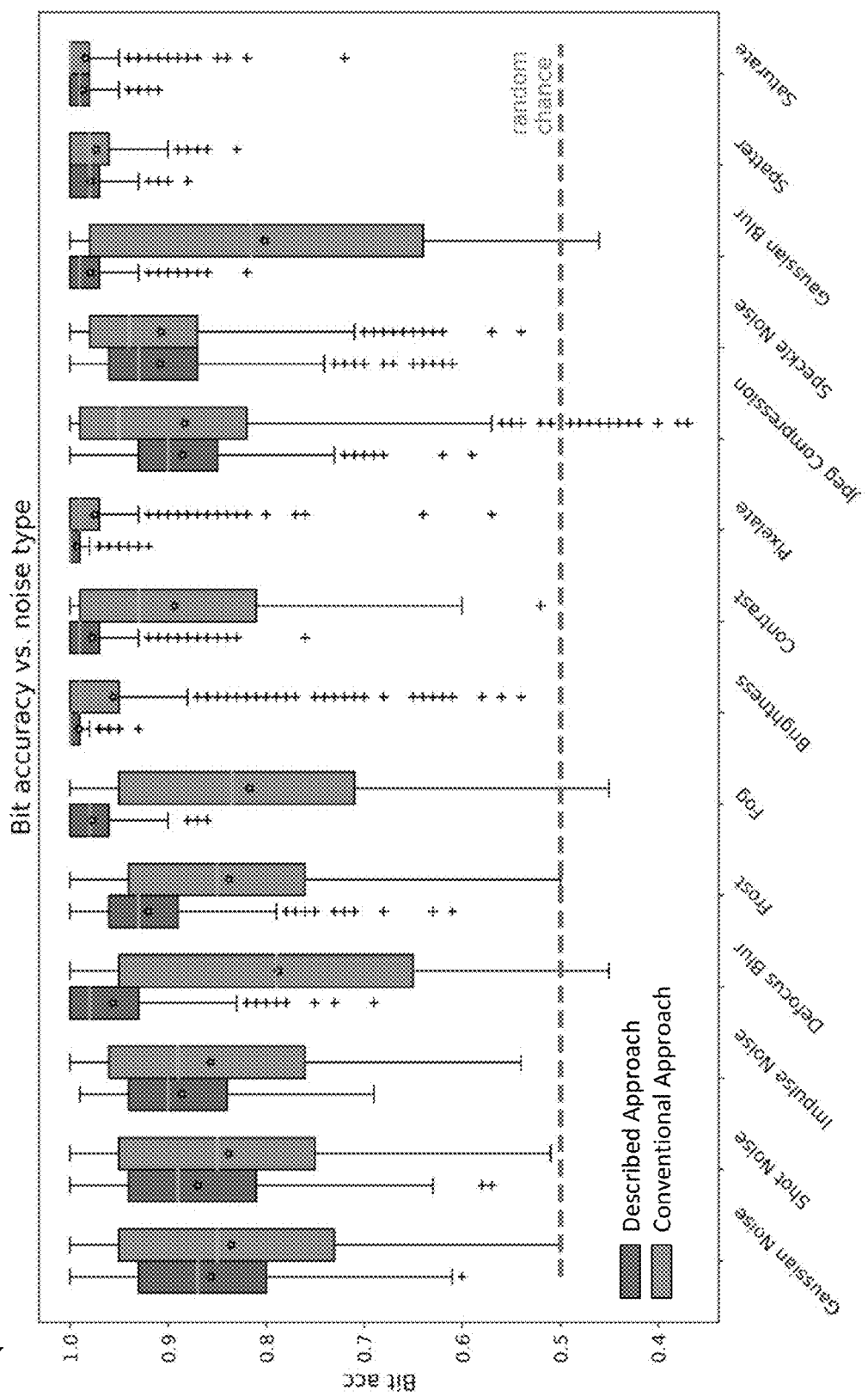
FIG. 7 depicts an example of robustness of the techniques described herein against various types of image perturbations compared to a conventional approach.

FIG. 7 depicts an example 700 of robustness of the techniques described herein against various types of image perturbations relative to a conventional approach. The illustrated example, for instance, depicts a box and whisker plot with various perturbations along the x-axis and bit accuracy along the y-axis. Bit accuracy, for instance, represents "how well" the respective approach recovers hidden information, e.g., a secret 122, from a steganographic image 118 that has a corresponding perturbation applied. A higher bit accuracy thus correlates to higher robustness against perturbations.

In this example, the blue boxes represent secret extraction using the techniques described herein and the orange boxes represent secret extraction using a conventional approach, such as a machine learning approach described by Tancik, et al. *StegaStamp: Invisible Hyperlinks in Physical Photographs*. In Proceedings of the IEEE/CVF Conference on Computer Vision and Pattern Recognition, pp. 2117-2126, (2020). Other conventional approaches that are not depicted do not account for image perturbations, and thus exhibit total loss and/or corruption of hidden information. A "star" symbol within each box further represents an average bit accuracy.

As illustrated, the average bit accuracy for the described approach is higher than the average bit accuracy for the conventional approach for each perturbation type. This indicates that the techniques described herein are more robust than the conventional approach and are able to recover the secret more accurately. Further, the spread of data for the described approach, which is indicated by a size of the box, is smaller than the spread of data for the conventional approach for each perturbation type. This indicates that the techniques described herein are more stable than even relatively robust conventional approaches and thus overcome conventional limitations related to robustness.

Coverless Steganographic Image Generation

As described above, the secret encoder 206 generates the secret embedding 216 independent of the input digital image 124. Thus, the secret embedding 216 is embeddable into a variety of sources of latent code without noticeably impacting visual properties of an image generated based on the latent code. Accordingly, the techniques described herein are further applicable for "coverless" and/or text-based steganography, e.g., generating a steganographic image 118 that is not based on an input image. For example, the steganography module 116 includes a coverless module 222 that is able to generate a steganographic image 118 without receiving an input image, e.g., the steganographic image 118 is not based on an input digital image 124.

Figure 8:
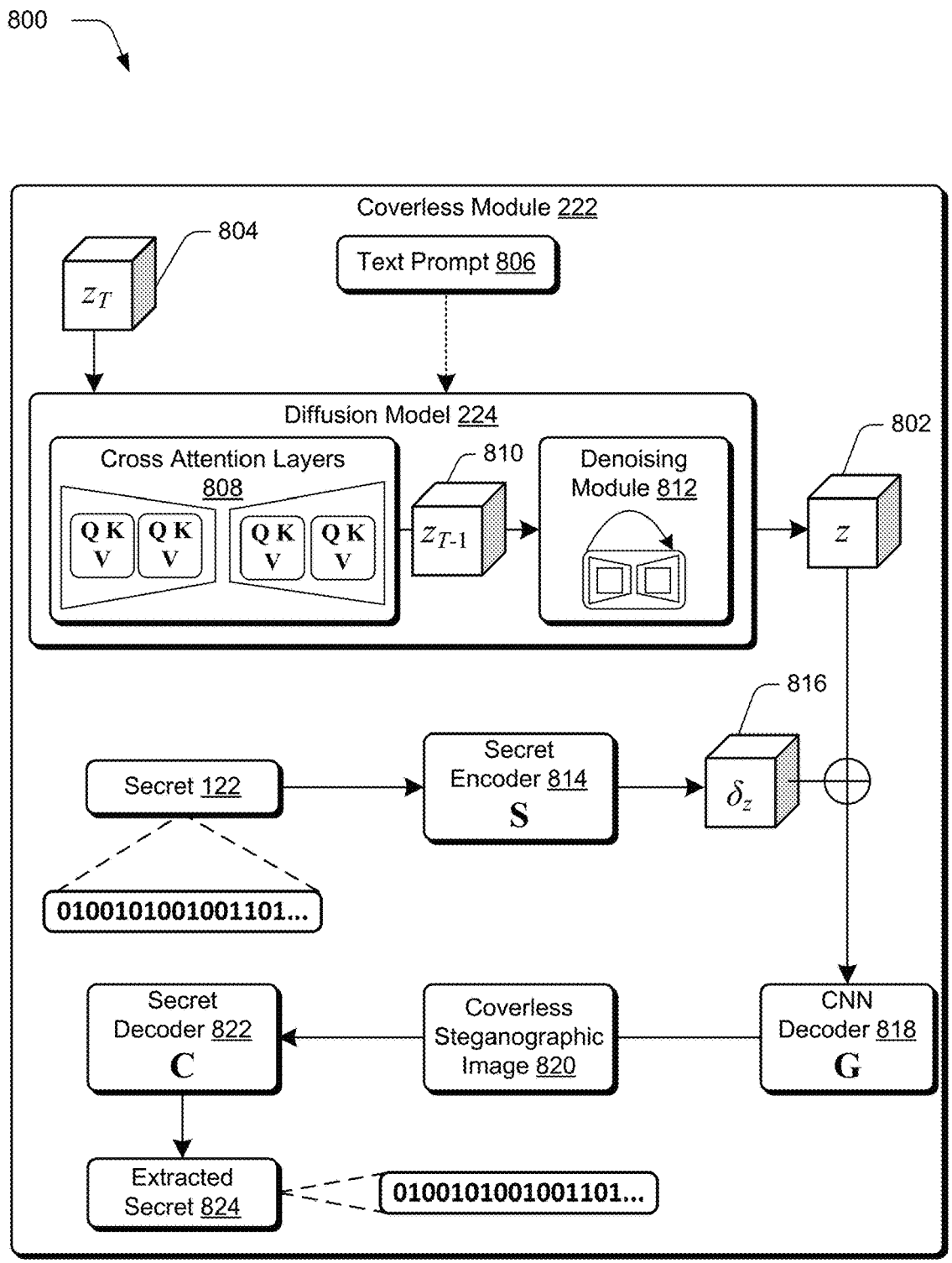
FIG. 8 depicts an example of operations of a coverless module in more detail to generate a coverless steganographic image.

FIG. 8 depicts an example 800 of operations of the coverless module 222 in more detail. In this example, the coverless module 222 receives an input that includes a secret 122 and latent code 802 (block 1102). As described above, the secret 122 includes a bit string, e.g., a sequence of binary digits. In various examples, the bit string is representative of one or more characters such as a "hidden message" to be concealed within a steganographic image 118.

In some examples, the latent code is randomly generated by the coverless module 222, however doing so results in arbitrary images, e.g., abstract images that may lack definable features. Accordingly, in the illustrated example, the coverless module 222 includes a diffusion model 224 such as a latent diffusion model that is operable to generate the latent code 802. In an example to do so, the diffusion model 224 receives an initial latent space 804, denoted $z_T$, that is normalized, e.g., that has a normalized distribution $\mathcal{N}(0, 1)$. The diffusion model 224 is configured to learn a mapping for the latent code 802 from a distribution, e.g., a normal/Gaussian distribution, and/or learn a mapping from an input such as a text prompt 806. For instance, in one example, the latent code 802 generated by the diffusion model 224 is based on a Gaussian distribution. Alternatively or additionally, the latent code 802 generated by the latent diffusion model is based on a text prompt 806 as further discussed below with respect to FIG. 9.

In some examples, the diffusion model 224 includes one or more cross-attention layers 808, e.g., multi-head attention layers. The one or more cross-attention layers 808 depicted in the illustrated example include matrices Q, K, and V. The diffusion model 224 in some examples generates an intermediate latent code representation 810. The diffusion model 224 is further operable to leverage a denoising module 812 to perform one or more denoising operations as part of generating the latent code 802. In various embodiments, the diffusion model 224 is a diffusion model as described by Rombach, et al. *High-resolution Image Synthesis with Latent Diffusion Models*. In Proceedings of the IEEE/CVF Conference on Computer Vision and Pattern Recognition, pp. 10684-10695, (2022).

The coverless module 222 further leverages an encoder, e.g., a secret encoder 814, to generate an embedding of the secret 122, e.g., the secret embedding 816, to act as a latent offset to the latent code 802 (block 1104). In the illustrated example, the secret encoder 814 is denoted S and the secret embedding 816 is denoted 6. In one or more examples, the secret encoder 814 is the secret encoder 206 as described above, and the secret embedding 816 shares one or more properties with the secret embedding 216. The latent offset represents a modification to the latent code 802 that includes relevant information such as a latent representation of the secret 122. However, the latent offset does not alter visual properties of an image subsequently generated based on the latent code.

The coverless module 222 is further operable to combine the embedding of the secret with the latent code 802 (block 1106). For instance, the secret embedding 816 and the latent code 802 are combined using one or more suitable mechanisms, e.g., concatenation, element-wise addition and/or averaging, linear combination, interpolation, etc. Alternatively or additionally, the secret embedding 816 and the latent code 802 are combined using an autoencoder, e.g., a CNN decoder 818.

The coverless module 222 is operable to leverage a decoder, e.g., the CNN decoder 818, to generate a coverless steganographic image 820 based on the combination of the secret embedding 816 and the latent code 802 (block 1108). In the illustrated example, the CNN decoder 818 is denoted G. In one or more examples, the CNN decoder 818 is the CNN decoder 218 as described above. Further, the coverless steganographic image 820 includes similar properties as the steganographic image 118 as described above, for instance the secret 122 is visually imperceptibly hidden within the coverless steganographic image 820. However, the coverless steganographic image 820 differs from the steganographic image 118 in that the coverless steganographic image 820 is not based on an input image.

The coverless module 222 is further operable to output the coverless steganographic image 820 (block 1110). For instance, the coverless module 222 outputs the coverless steganographic image 820 for display in a user interface 110 of a display device 112. Alternatively or additionally, the coverless module 222 communicates the coverless steganographic image 820 via a network 114, such as to upload or post the coverless steganographic image 820 to the internet.

In some examples, the coverless module 222 is further operable to extract the secret 122 from the coverless steganographic image (block 1112). For instance, the coverless module 222 further leverages a decoder, such as a secret decoder 822, denoted C in the illustrated example, to recover the secret, e.g., the extracted secret 824, from the coverless steganographic image 820. The extracted secret 824 includes the same bit string as the secret 122. In some examples, the secret decoder 822 is the secret decoder 208 as described above. Because the steganographic image 118 is included in the latent code 802 of the coverless steganographic image 820, the techniques described herein have increased secret recovery performance relative to conventional approaches.

Figure 9:
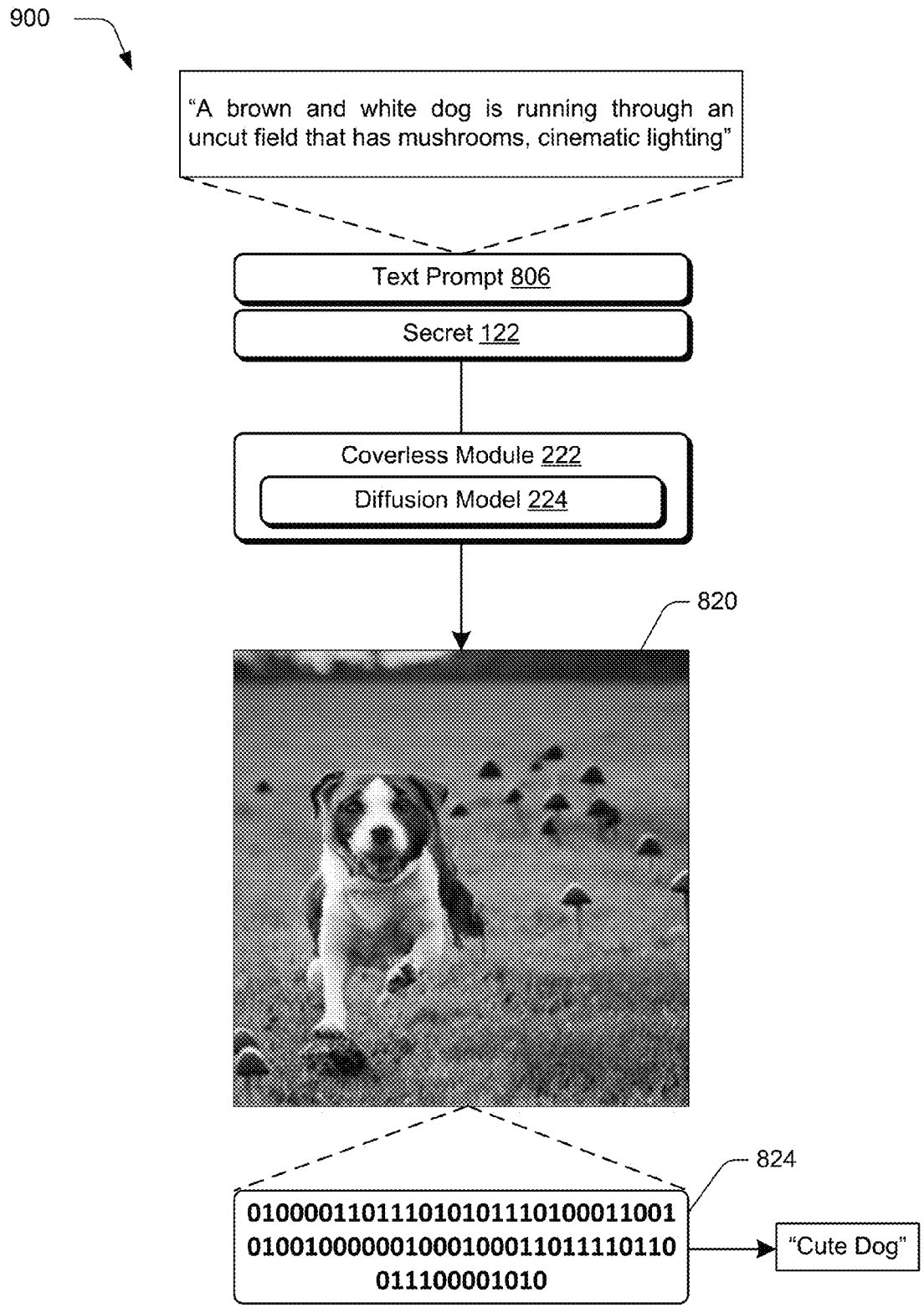
FIG. 9 depicts an example of generation of a steganographic image based on a text prompt.

FIG. 9 depicts an example 900 of generation of a steganographic image based on a text prompt 806. In this example, a user desires to generate a coverless steganographic image 820 to conceal a hidden message. Accordingly, the coverless module 222 receives as input a secret 122, e.g., a bit string to represent the hidden message "Cute Dog." The coverless module 222 further receives a text prompt 806 on which the coverless steganographic image 820 is based. In this example, the text prompt 806 includes the text "A brown and white dog is running through an uncut field that has mushrooms, cinematic lighting."

The coverless module 222 leverages a diffusion model 224 to generate latent code 802 based on the text prompt 806. Further, the coverless module 222 generates a secret embedding 816 using a secret encoder 814. The CNN decoder 818 then generates a coverless steganographic image 820 based on a combination of the secret embedding 816 and the latent code 802. As illustrated, the coverless steganographic image 820 depicts a visual representation of the text prompt 806 that includes the secret 122. The coverless module 222 is further operable to leverage the secret decoder 822 to extract the secret, e.g., the extracted secret 824, from the coverless steganographic image 820. As illustrated, the extracted secret 824 matches the secret 122 and includes a bit string that represents the phrase "Cute Dog." Thus, the techniques described herein support a variety of functionalities such as covert communication, secure information transfer, content provenance verification, etc.

Example System and Device

Figure 12:
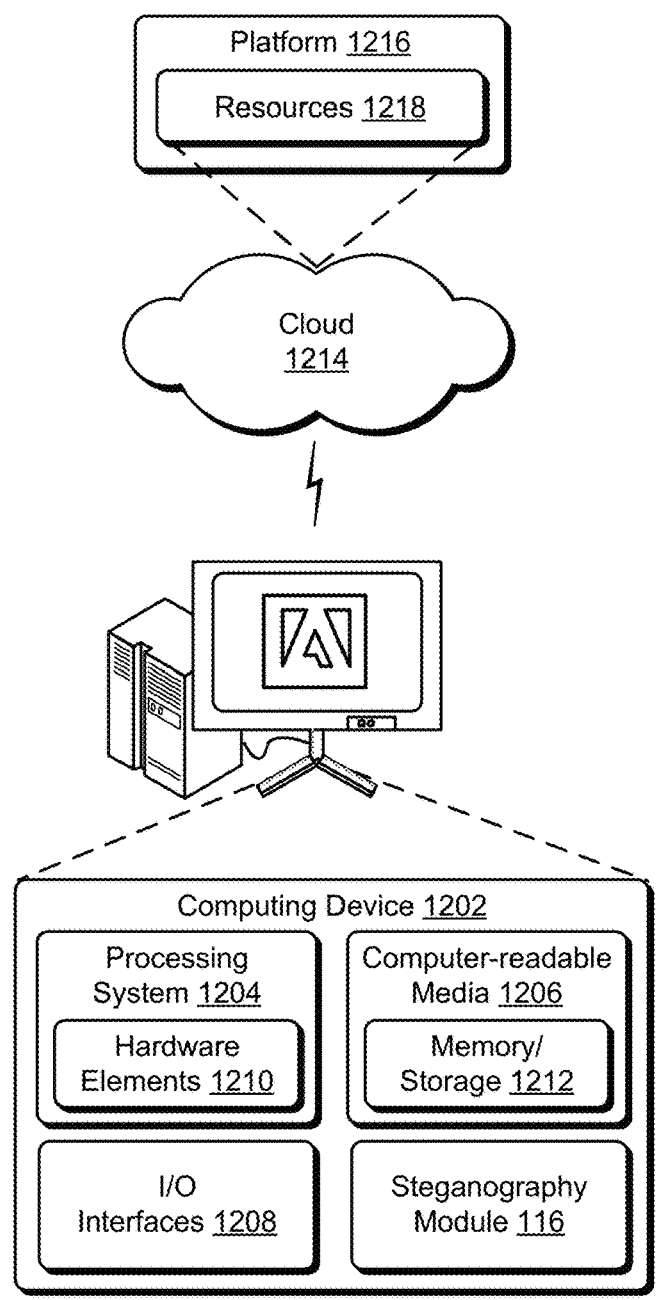
FIG. 12 illustrates an example system including various components of an example device that can be implemented as any type of computing device as described and/or utilized with reference to FIGS. 1-11 to implement embodiments of the techniques described herein.

FIG. 12 illustrates an example system generally at 1200 that includes an example computing device 1202 that is representative of one or more computing systems and/or devices that implement the various techniques described herein. This is illustrated through inclusion of the steganography module 116. The computing device 1202 is configurable, for example, as a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that is configurable as processors, functional blocks, and so forth. This includes implementation in hardware as an application specific integrated circuit or other logic device formed using one or more semiconductors. The hardware elements 1210 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1206 is illustrated as including memory/storage 1212. The memory/storage 1212 represents memory/storage capacity associated with one or more computer-readable media. The memory/storage 1212 includes volatile media (such as random-access memory (RAM)) and/or nonvolatile media (such as read only memory (ROM), Flash memory, optical disks, magnetic disks, and so forth). The memory/storage 1212 includes fixed media (e.g., RAM, ROM, a fixed hard drive, and so on) as well as removable media (e.g., Flash memory, a removable hard drive, an optical disc, and so forth). The computer-readable media 1206 is configurable in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1202. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1202, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employed to implement various techniques described herein. Accordingly, software, hardware, or executable modules are implemented as one or more instructions and/or logic embodied on some form of computer-readable storage media and/or by one or more hardware elements 1210. The computing device 1202 is configured to implement particular instructions and/or functions corresponding to the software and/or hardware modules. Accordingly, implementation of a module that is executable by the computing device 1202 as software is achieved at least partially in hardware, e.g., through use of computer-readable storage media and/or hardware elements 1210 of the processing system 1204. The instructions and/or functions are executable/operable by one or more articles of manufacture (for example, one or more computing devices 1202 and/or processing systems 1204) to implement techniques, modules, and examples described herein.

The techniques described herein are supported by various configurations of the computing device 1202 and are not limited to the specific examples of the techniques described herein. This functionality is also implementable all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 abstracts resources and functions to connect the computing device 1202 with other computing devices. The platform 1216 also serves to abstract scaling of resources to provide a corresponding level of scale to encountered demand for the resources 1218 that are implemented via the platform 1216. Accordingly, in an interconnected device embodiment, implementation of functionality described herein is distributable throughout the system 1200. For example, the functionality is implementable in part on the computing device 1202 as well as via the platform 1216 that abstracts the functionality of the cloud 1214.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   receiving, by a processing device, a digital image and a secret that includes a bit string representing one or more characters;
   generating, by a pretrained encoder of a convolutional neural network of the processing device, an embedding of the digital image that includes latent code;
   generating, by a secret encoder of the processing device, an embedding of the secret to act as a latent offset to the latent code; and
   outputting, by the processing device, a steganographic image that is visually indiscernible from the digital image and includes the secret, the steganographic image generated by inputting the embedding of the digital image and the embedding of the secret to a pretrained decoder of the convolutional neural network.

2. The method as described in claim 1, wherein the embedding of the secret is generated with a dimensionality that corresponds to a dimensionality of the embedding of the digital image.

3. The method as described in claim 1, wherein the embedding of the secret is incorporated into the latent code before input to the pretrained decoder of the convolutional neural network.

4. The method as described in claim 1, wherein the secret includes content provenance information associated with the digital image.

5. The method as described in claim 1, further comprising training the secret encoder using training pairs that each include a training digital image and a randomly generated training secret, the training further including generating training steganographic images based on the training pairs.

6. The method as described in claim 5, wherein the training the secret encoder includes calculating a quality loss and a recovery loss.

7. The method as described in claim 6, wherein the quality loss measures a visual difference between a particular training image and a corresponding training steganographic image and is based on a pixel loss and a perceptual loss.

8. The method as described in claim 1, further comprising extracting the secret from the steganographic image using a secret decoder.

9. The method as described in claim 8, wherein the secret decoder is trained to withstand image perturbations applied to the steganographic image using a noise model.

10. A system comprising:
a memory component; and
a processing device coupled to the memory component, the processing device to perform operations comprising:
receiving a steganographic image that includes a secret that includes a bit string representing one or more characters, the steganographic image generated by incorporating an embedding of the secret within latent code used to render the steganographic image;
extracting the secret from the steganographic image using a secret decoder, the secret decoder trained to withstand image perturbations using a noise model; and
outputting the one or more characters included in the secret in a user interface of the processing device.

11. The system as described in claim 10, the operations further comprising training the secret decoder using training steganographic images and ground truth secrets to generate predicted secrets, the training includes determining a bit recovery loss based on the predicted secrets and corresponding ground truth secrets.

12. The system as described in claim 11, wherein the training includes using the noise model to apply one or more image perturbations to the training steganographic images, the one or more image perturbations including one or more of a differentiable perturbation, a non-differentiable perturbation, or a perturbation that is approximatable with a differentiable transform.

13. The system as described in claim 12, wherein the one or more image perturbations simulate redistribution of the steganographic image in an online context.

14. The system as described in claim 12, wherein the one or more image perturbations include non-differentiable noise, and applying the one or more image perturbations includes converting the non-differentiable noise to additive noise.

15. The system as described in claim 10, wherein the secret indicates whether the steganographic image was generated using generative artificial intelligence.

16. The system as described in claim 10, wherein the secret indicates an authorship of the steganographic image.

17. A non-transitory computer-readable medium storing executable instructions, which when executed by a processing device, cause the processing device to perform operations comprising:
receiving a secret that includes a bit string representing one or more characters and latent code generated by a latent diffusion model;
generating, by a secret encoder of the processing device, an embedding of the secret to act as a latent offset to the latent code;
combining the embedding of the secret with the latent code generated by the latent diffusion model; and
outputting a steganographic image generated by a decoder of a convolutional neural network based on the combination of the embedding of the secret and the latent code, the secret visually imperceptibly hidden within the steganographic image.

18. The non-transitory computer-readable medium as described in claim 17, wherein the latent code generated by the latent diffusion model is based on a text prompt.

19. The non-transitory computer-readable medium as described in claim 17, wherein the latent code generated by the latent diffusion model is based on a Gaussian distribution.

20. The non-transitory computer-readable medium as described in claim 17, wherein the operations further include extracting the secret from the steganographic image using a secret decoder.

* * * * *